(12) United States Patent
Takahashi

(10) Patent No.: US 11,872,698 B2
(45) Date of Patent: Jan. 16, 2024

(54) CONTROLLER OF ROBOT AND CONTROL METHOD

(71) Applicant: CANON KABUSHIKI KAISHA, Tokyo (JP)

(72) Inventor: Masakazu Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 16/269,306

(22) Filed: Feb. 6, 2019

(65) Prior Publication Data

US 2019/0248006 A1   Aug. 15, 2019

(30) Foreign Application Priority Data

Feb. 13, 2018  (JP) .................................. 2018-023368
Dec. 4, 2018  (JP) .................................. 2018-227346

(51) Int. Cl.
  *B25J 9/16*   (2006.01)
  *B25J 13/08*   (2006.01)

(52) U.S. Cl.
  CPC .............. *B25J 9/163* (2013.01); *B25J 9/161* (2013.01); *B25J 13/085* (2013.01); *B25J 13/088* (2013.01)

(58) Field of Classification Search
  CPC ........ B25J 9/163; B25J 13/0088; B25J 9/161; B25J 13/085
  USPC ....................................................... 700/253
  See application file for complete search history.

(56) References Cited

U.S. PATENT DOCUMENTS

| 6,084,374 A * | 7/2000 | Nakatsuka ............. B25J 9/1638 |
| | | 318/568.1 |
| 6,691,000 B2 * | 2/2004 | Nagai .................... B25J 9/1689 |
| | | 318/649 |
| 8,676,379 B2 * | 3/2014 | Okazaki ................. B25J 13/084 |
| | | 700/255 |

(Continued)

FOREIGN PATENT DOCUMENTS

| CN | 101432103 B | 5/2012 |
| CN | 104972473 A | 10/2015 |

(Continued)

OTHER PUBLICATIONS

Chinese Office Action dated Jun. 15, 2022 during prosecution of related Chinese application No. 201910111920.3 (English-language machine translation included.).

(Continued)

*Primary Examiner* — Ryan Rink
*Assistant Examiner* — Rodney P King
(74) *Attorney, Agent, or Firm* — VENABLE LLP

(57) ABSTRACT

A robot includes a handling portion handled in teaching an operation of a robot arm, a first sensor acquiring data of a first force acting on a tip of the robot arm, a second sensor acquiring data of a second force acting on the handling portion and a third sensor acquiring data of position and orientation of the tip of the robot arm. A controller of the robot is configured to generate teaching data having a first period and a second period based on analytical results of the first and second force data at a time of teaching the robot arm. The robot arm is controlled by position and orientation control based on the position and orientation data of the third sensor in the first period. The robot arm is controlled by force control based on the first and second force data in the second period.

37 Claims, 19 Drawing Sheets

(56) References Cited

U.S. PATENT DOCUMENTS

| | | | |
|---|---|---|---|
| 9,114,530 B2* | 8/2015 | Tsusaka | G05B 19/423 |
| 9,522,470 B2* | 12/2016 | Nakagawa | B25J 9/1676 |
| 10,406,644 B2* | 9/2019 | Kunihiro | B23Q 7/043 |
| 10,525,594 B2* | 1/2020 | Ogata | B25J 9/1666 |
| 2013/0310977 A1 | 11/2013 | Tsusaka et al. | |
| 2015/0105907 A1* | 4/2015 | Aiso | B25J 9/1697 |
| | | | 700/259 |
| 2017/0028557 A1* | 2/2017 | Battisti | B25J 9/1684 |
| 2018/0043453 A1* | 2/2018 | Yamasaki | B23K 9/0953 |

FOREIGN PATENT DOCUMENTS

| | | | |
|---|---|---|---|
| CN | 106945007 A | | 7/2017 |
| CN | 105382836 B | | 8/2017 |
| CN | 107249801 A | | 10/2017 |
| JP | H02-59287 A | | 2/1990 |
| JP | H11-231925 A | | 8/1999 |
| JP | 2008-134903 | | 6/2008 |
| JP | 2008134903 A | * | 6/2008 |
| JP | 2010-142909 A | | 7/2010 |
| JP | 2017-124455 A | | 7/2017 |

OTHER PUBLICATIONS

Japanese Office Action dated Nov. 1, 2022 during prosecution of related Japanesse application No. 2018-227346 (English-language machine translation included.).

* cited by examiner

FIG.3
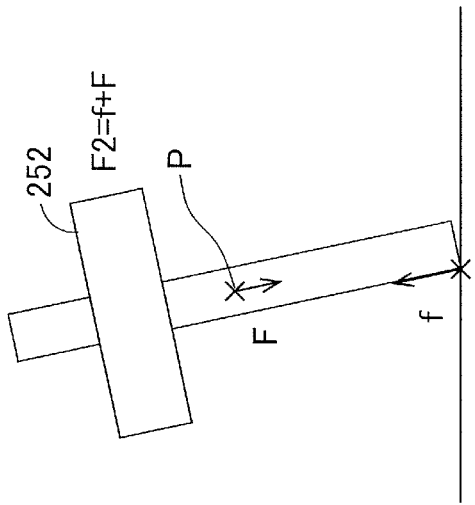
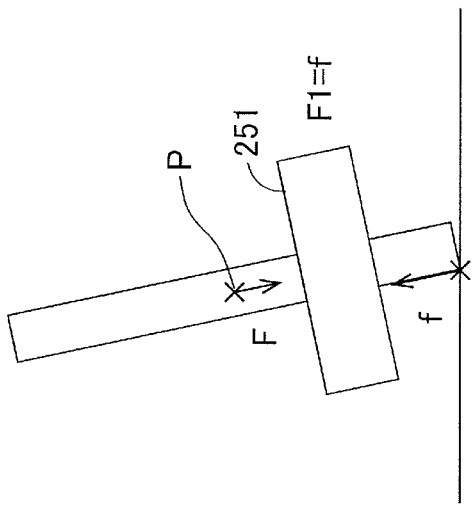
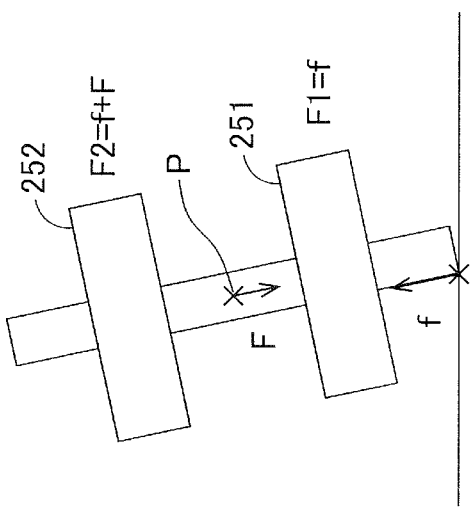

FIG.8
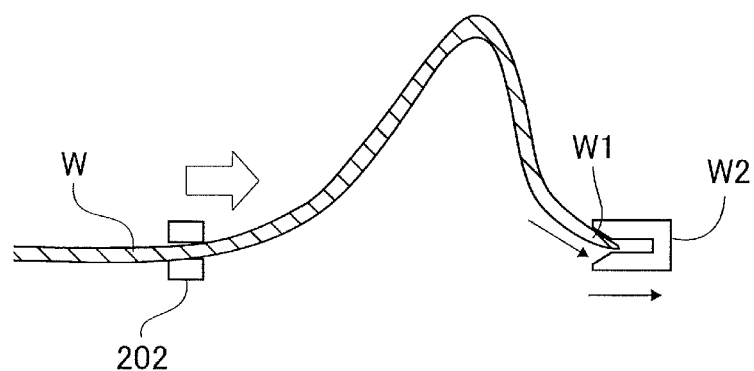
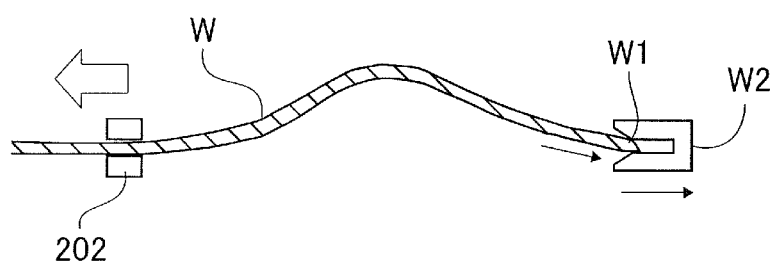

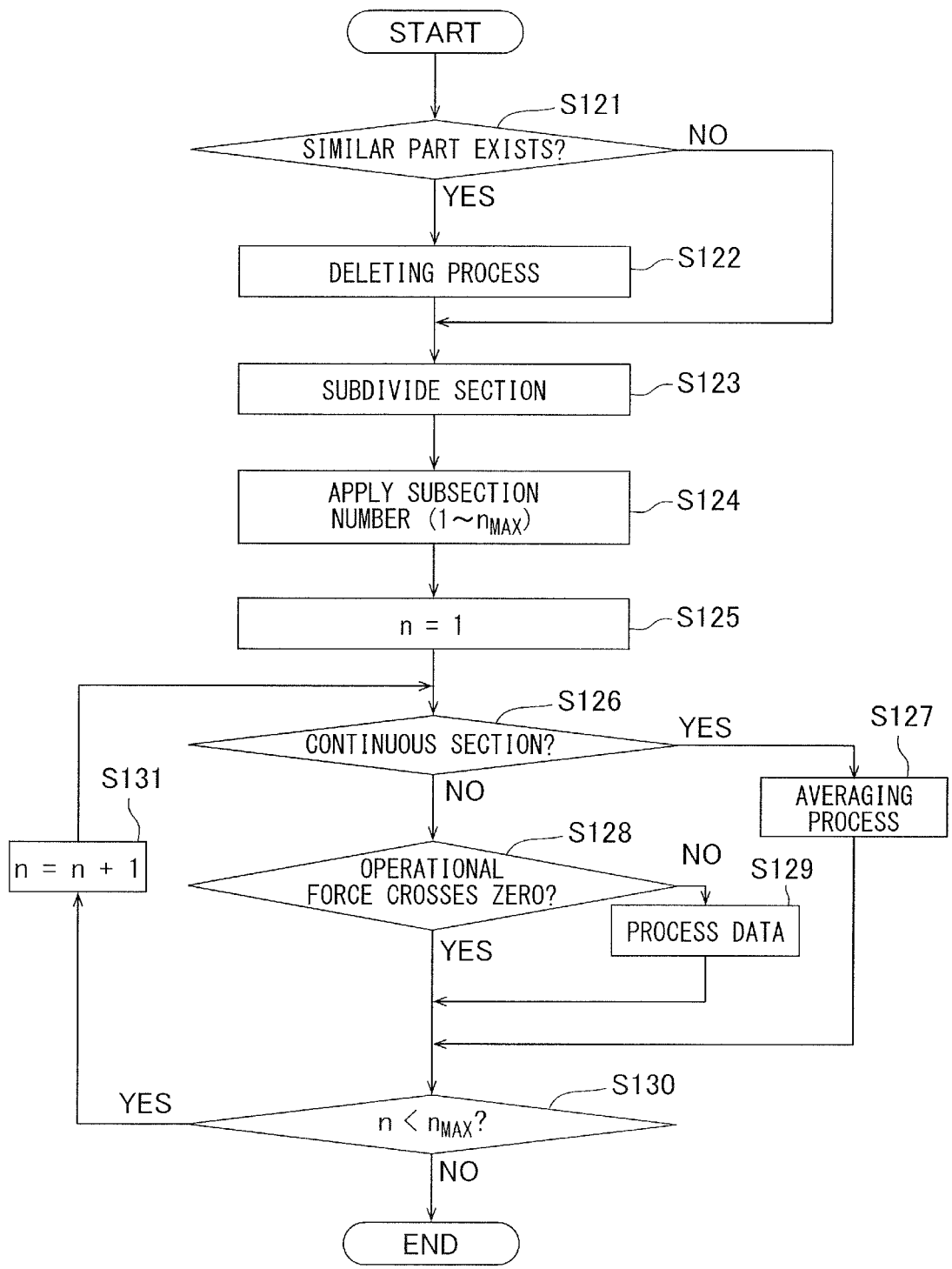

APPLIED DIRECTION OF OPERATIONAL FORCE

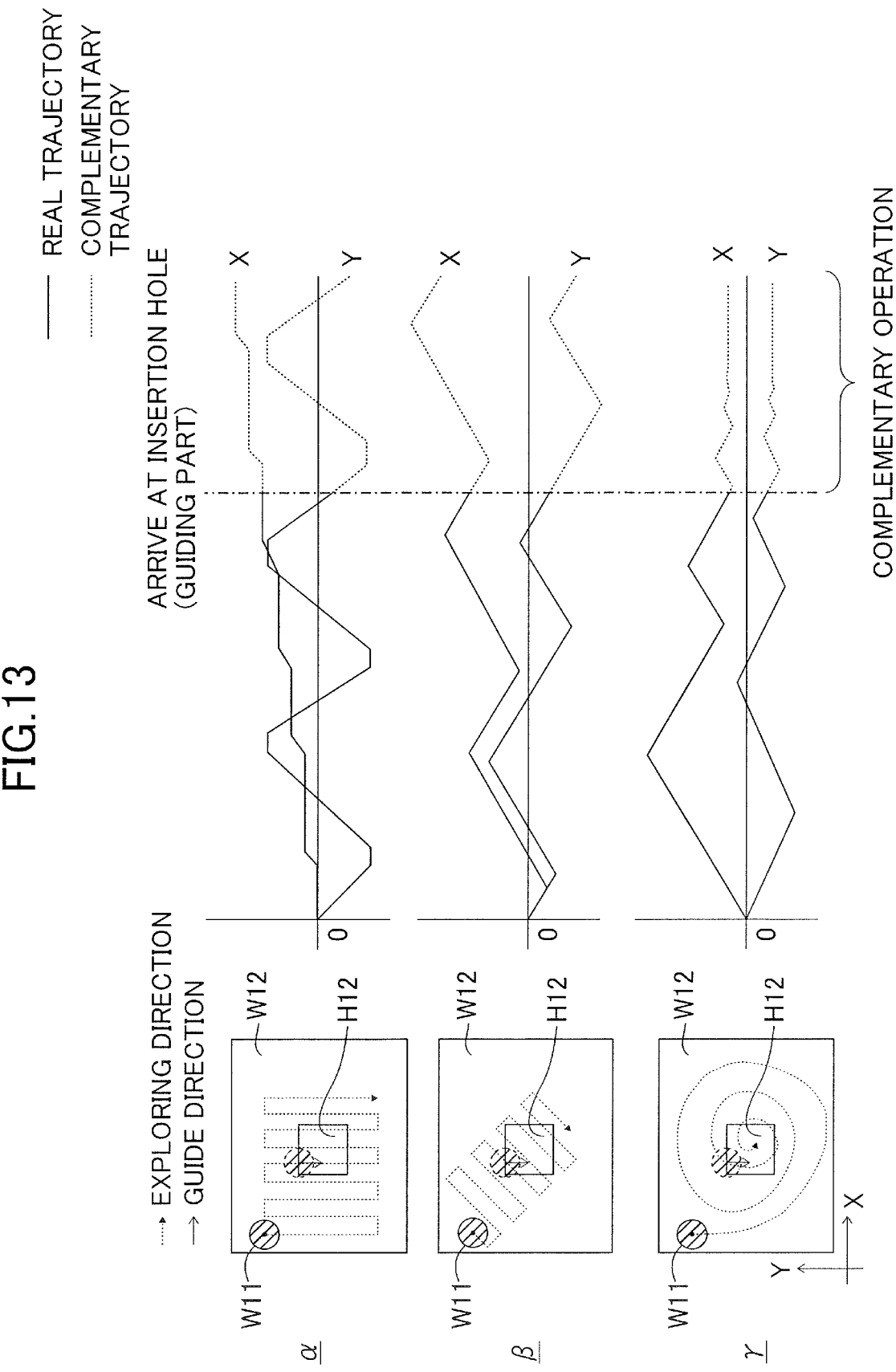

CONTROLLER OF ROBOT AND CONTROL METHOD

BACKGROUND OF THE INVENTION

Field of the Invention

The present invention relates to a controller and a control method of a robot that enable a teacher to perform direct teaching of teaching an operation of a robot arm by manually manipulating the robot arm.

Description of the Related Art

Hitherto, in teaching an operation of a robot arm, a teacher used to perform an operation of moving an end effector or the like to a teaching position by using an operation portion such as a teaching pendant and to store the teaching position while visually confirming the position. In such a case, while the teacher needs to repeat an operation of minutely moving the robot arm by inputting coordinates in the teaching pendant or by operating the teaching pendant, the teacher cannot teach efficiently because such works are cumbersome.

Then, as one of methods of improving the operability in teaching, there is a technology called direct teaching. The direct teaching is what a teacher holds a predetermined part of a robot to manually manipulate a robot arm, to acquire position and orientation data of a tip of the robot arm at that time, to generate an operation command value of the robot arm based on the data and to reproduce an assembling operation at the time of teaching. The direct teaching enables to generate teaching data that operates the robot arm simply without cumbersome works because it enables to teach intuitively just by manually guiding the robot arm. In a case where the teacher manually manipulates the robot arm, a robot controller executes a control called a compliance control or an impedance control in general. For instance, the robot controller operates the robot arm in a direction in which the teacher has applied a force by controlling the robot arm such that a force applied to the tip of the robot arm is zeroed.

Japanese Patent Application Laid-open No. 2008-134903 discloses a method of acquiring time series data of force torque data together with position and orientation data as a teacher manually manipulates a robot arm to generate force teaching data related with a contact force.

However, the method disclosed in Japanese Patent Application Laid-open No. 2008-134903 is what generates the force teaching data related to the contact force. Due to that, even if the robot arm is operated regeneratively in accordance to the force teaching data described in Japanese Patent Application Laid-open No. 2008-134903, the robot arm does not necessarily operate as instructed by the teacher at part where precision works such as assembling works are required.

SUMMARY OF THE INVENTION

According to a first aspect of the present invention, a controller of a robot including a handling portion handled in teaching an operation of a robot arm, a first sensor configured to acquire data of a first force acting on a tip of the robot arm, a second sensor configured to acquire data of a second force acting on the handling portion and a third sensor configured to acquire data of position and orientation of the tip of the robot arm, the controller includes a generating portion configured to generate teaching data having a first period and a second period based on analytical results of the first and second force data at a time of teaching the robot arm, the first period being a period in which the robot arm is controlled by position and orientation control based on the position and orientation data of the third sensor, the second period being a period in which the robot arm is controlled by force control based on the first and second force data, and a storage portion configured to store the generated teaching data.

According to a second aspect of the present invention, a control method of a controller controlling a robot provided with a handling portion which is handled in teaching an operation of a robot arm, the control method includes acquiring data of first force acting on a tip of the robot by using a first sensor, data of a second force acting on the handling portion by using a second sensor and data of position and orientation of the tip of the robot arm, and generating teaching data having a first period and a second period based on analytical results of the first and second force data at a time of teaching the robot arm, the first period being a period in which the robot arm is controlled by position and orientation control based on the position and orientation data of the third sensor, the second period being a period in which the robot arm is controlled by force control based on the first and second force data.

Further features of the present invention will become apparent from the following description of exemplary embodiments with reference to the attached drawings.

BRIEF DESCRIPTION OF THE DRAWINGS

FIG. 3 illustrates forces measured by sensors of the first embodiment.

FIG. 8 illustrates a case of conducting a retrying operation in teaching of connector connection by the robot of the first embodiment.

FIG. 11 is a flowchart illustrating a force command value generating process in FIG. 10.

FIG. 13 illustrates specific examples of complementing trajectories of the first embodiment.

DESCRIPTION OF THE EMBODIMENTS

Embodiments for carrying out the present disclosure will be described below with reference to the drawings.

First Embodiment

Figure 1:
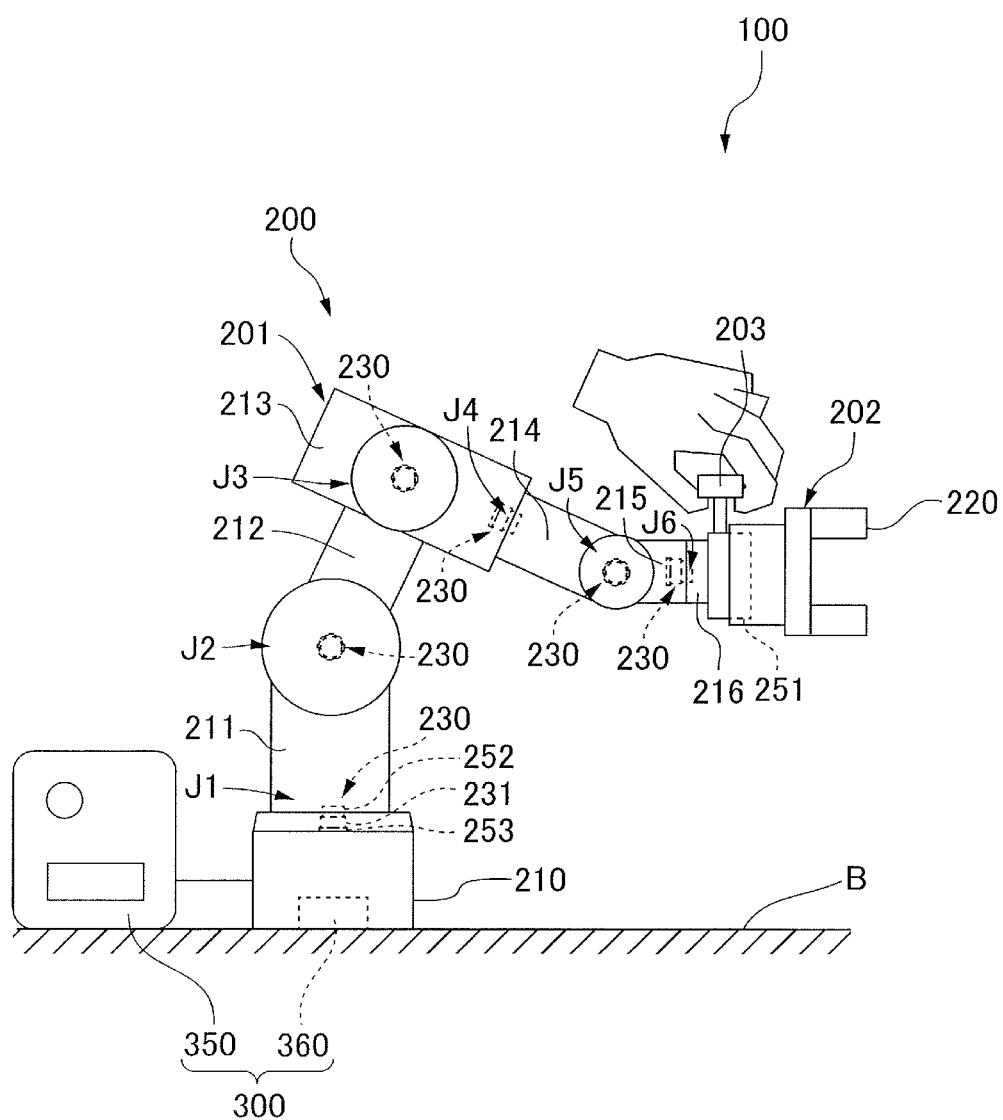
FIG. 1 illustrates a robot system of a first embodiment of the present disclosure.

FIG. 1 illustrates a robot system of a first embodiment of the present disclosure. The robot system 100 in FIG. 1 includes a robot 200 and a control system 300 which is one exemplary controller for controlling the robot 200. The control system 300 includes a robot controller 350 and a servo controller 360.

The robot 200 is a vertical articulated industrial robot. The robot 200 includes a robot arm 201, a hand 202 which is one exemplary end effector and a handling portion 203. The handling portion 203 is attached at a tip of the robot arm 201. The hand 202 is supported at the tip of the robot arm 201 through the handling portion 203. That is, the handling portion 203 is provided between the tip of the robot arm 201 and the hand 202. The handling portion 203 is a part manipulated by a teacher when an operation of the robot arm 201 is directly taught and is formed into such a shape that enables the teacher to grip and to manipulate.

The robot arm 201 includes a plurality of, e.g., seven, links 210 through 216 connected in series and a base end (fixed end) thereof is fixed to a base B on which a work target object for example is placed. In the present embodiment, the seven links 210 through 216 are connected by six joints J1 through J6. Note that the number of links is not limited to be seven. Each of the joints J1 through J6 is either a linear motion joint, a swing joint or a rotational joint (also called as a torsion joint). In the present embodiment, joints J2, J3 and J5 are the swing joints and joints J1, J4 and J6 the rotational joints. The link 210 is a base end of the robot arm 201. The link 216 is a distal end (free end) of the robot arm 201. The hand 202 includes a plurality of fingers 220 and is enabled to grip a workpiece or the like by operating the plurality of fingers 220.

A force sensor 251 which is one exemplary first sensor is disposed between the hand 202 and the handling portion 203. The hand 202 is supported by the force sensor 251, and the force sensor 251 is supported by the handling portion 203. The force sensor 251 is built in the hand 202. Note that although the force sensor 251 is built in the hand 202 in the present embodiment, the force sensor 251 may be disposed between the hand 202 and the handling portion 203 or may be built in the handling portion 203. The force sensor 251 is used to measure six-axial forces acting on the hand 202. The six-axial forces are translation forces in three axis directions orthogonal with each other and rotational forces around each axis, i.e., a rotational moment. The force acting on the hand 202 is a reaction force (referred to as a "contact force" hereinafter) generated when the hand 202 or a gripped body gripped by the hand 202 comes into contact with a work target object. The contact force is also a force of the hand 202 applied to the work target object.

The force sensor 251 outputs a signal corresponding to a force acting on itself, i.e., a contact force, with a predetermined frequency to the robot controller 350 of the control system 300. Based on the signal obtained from the force sensor 251, the robot controller 350 performs a process of finding force acting on the hand 202. Thus, the control system 300, i.e., the robot controller 350 can measure the force acting on the hand 202 by using the force sensor 251. That is, the force sensor 251 is configured so as to acquire data of a first force F1 acting on the tip of the robot 200. Note that the device including the end effector is called as the robot in the present embodiment as described above. Therefore, if the end effector is attached, a tip of the end effector is the tip of the robot.

A driver 230 is disposed in each of the joints J1 through J6 of the robot arm 201. Each driver 230 includes a motor 231 rotationally driving a corresponding joint. An orientation of the robot arm 201 can be changed by operating the motor 231 disposed in each of the joints J1 through J6. The hand 202 supported at the tip of the robot arm 201 can be changed to an arbitrary position and orientation by changing the orientation of the robot arm 201. The "position and orientation" at the tip of the robot arm 201 will be referred simply as a "position" hereinafter.

Each of the drivers 230 also includes a torque sensor 252. That is, a plurality of torque sensors 252, which is one example a second sensor, is disposed in the joints J1 through J6. Each of the torque sensors 252 outputs a signal corresponding to a torque acting on each of the joints J1 through J6, i.e., a torque acting between a pair of links connecting each of the joints J1 through J6, with a predetermined frequency to the robot controller 350. Based on the signals acquired from the plurality of torque sensors 252, the robot controller 350 performs a process of finding a force acting on the tip of the robot arm 201, i.e., on the handling portion 203 attached to the link 216. Thus, the robot controller 350 can measure the force acting on the tip of the robot arm 201, i.e., on the handling portion 203, by using the plurality of torque sensors 252. That is, the torque sensor 252 is configured so as to acquire data of the second force F2 acting on the handling portion 203. The force acting on the handling portion 203 includes a contact force besides an operational force applied to the handling portion 203 when a teacher holds and manipulates the handling portion 203. Note that the force sensor 251 serving as the first sensor is disposed closer to the tip of the robot (closer to the end effector) than the torque sensor 252 serving as the second sensor.

Each driver 230 also includes an encoder 253. That is, a plurality of encoders 253 which is one example of a third sensor is disposed in the joints J1 through J6 of the robot arm 201. Each encoder 253 is a rotary encoder and outputs a signal corresponding to a rotational angle of a rotary shaft of the motor 231 to the robot controller 350 and a servo controller 360 with predetermine frequency. Based on the signals acquired from the plurality of encoders 253, the robot controller 350 performs a process of finding a position of the tip of the robot arm 201. Thus, the robot controller 350 is enabled to measure the position of the tip of the robot arm 201 by using the plurality of encoders 253. That is, the encoder 253 is configured so as to acquire position and orientation data of the tip of the robot arm 201.

Figure 2:
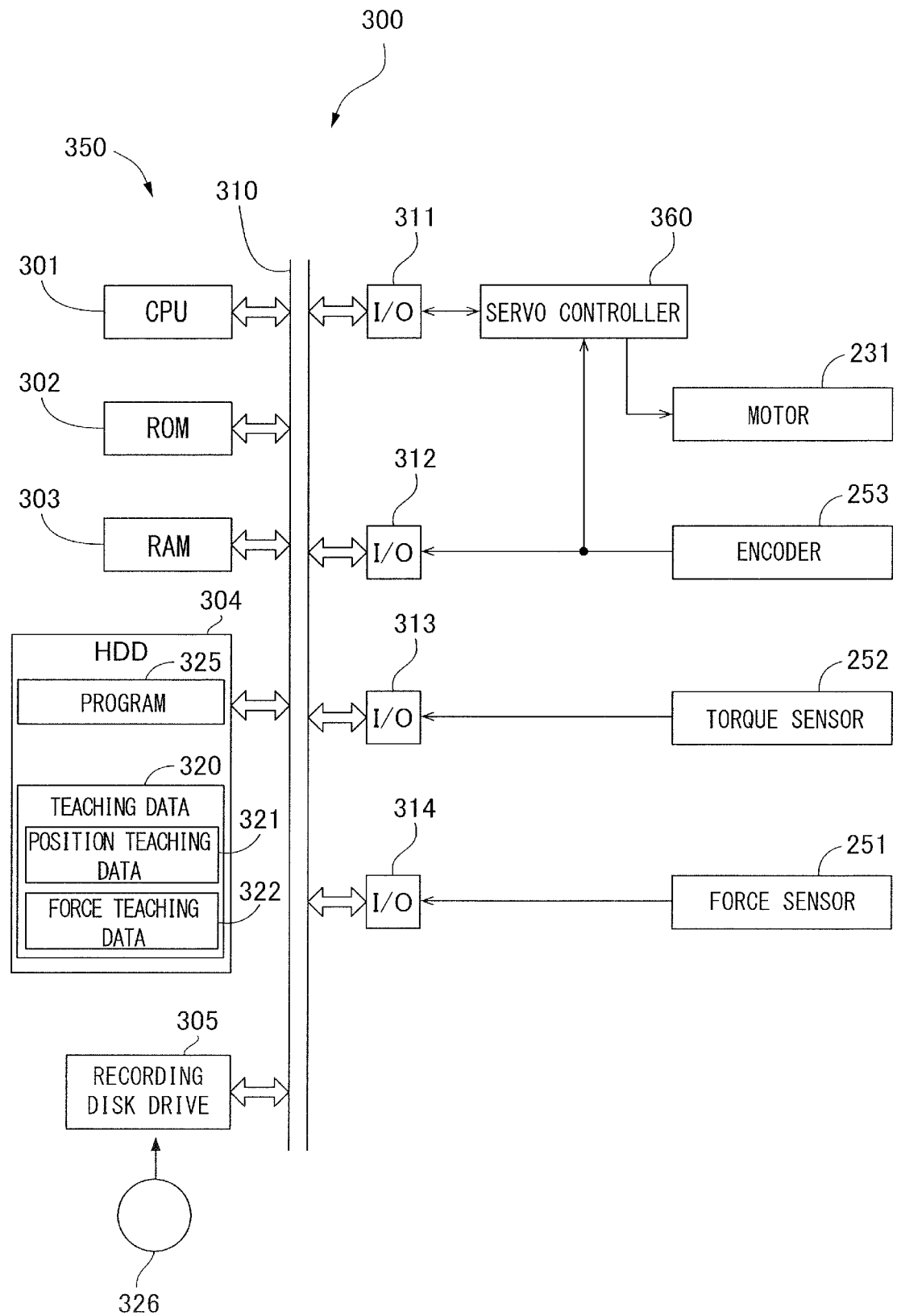
FIG. 2 is a block diagram illustrating a control system of the robot system of the first embodiment.

FIG. 2 is a block diagram illustrating a control system of the robot system 100 of the first embodiment. The robot controller 350 is composed of a computer and includes a CPU (Central Processing Unit) 301 which is one exemplary processing unit. The robot controller 350 includes also a ROM (Read Only Memory) 302, a RAM (Random Access Memory) 303 and an HDD (Hard Disk Drive) 304. The robot controller 350 also includes a recording disk drive 305 and I/Os 311 through 314 which are input/output interfaces.

The CPU 301, the ROM 302, the RAM 303, the HDD 304, the recording disk drive 305 and the I/Os 311 through 314 are connected through a bus 310 so as to be communicable with each other. The I/O 311 is connected with the servo controller 360 and the I/O 312 is connected with the encoder 253. The I/O 313 is connected with the torque sensor 252 and the I/O 314 is connected with the force sensor 251.

The motor 231 and the encoder 253 corresponding to each of the joints J1 through J6 is connected with the servo controller 360. Note that although FIG. 2 illustrates the motor 231, the encoder 253 and the torque sensor 252 of only one joint, there are the six joints in the first embodiment. Therefore, there are six each of the motors 231, encoders 253 and torque sensors 252 in FIG. 2 although not illustrated.

The CPU 301 controls an operation of the robot arm 201 by controlling the motor 231 driving each of the joints J1 through J6 of the robot arm 201 through the servo controller 360. The HDD 304 which is one exemplary storage unit stores a controlling and calculating program 325 and a teaching data 320. A recording disk drive 305 enables to read out various data and programs recorded in a recording disk 326. A program 325 causes the CPU 301 to perform various arithmetic operations and various controls described later.

Teaching data 320 is generated by the CPU 301 when the robot arm 201 is taught and is time series data of operation command values given with a predetermined frequency of 1 [ms] for example. The CPU 301 is set either in a teaching mode or in a regeneration operating mode through a switch not illustrated, provided in the robot controller 350 and manipulated by a person.

In a case where the CPU 301 is set in the teaching mode, the CPU 301 controls the robot arm 201 so as to operate following a direction of a force acting on the robot arm 201 by impedance controlling the robot arm 201. Then, the CPU 301 generates the teaching data 320 and stores it in the HDD 304. In a case where the CPU 301 is set in the regeneration operating mode, the CPU 301 operates the robot arm 201 following the teaching data 320 stored in the HDD 304. The teaching data 320 is called also as trajectory data.

The operation command value included in the teaching data 320 is either a position command value or a force command value. The position command value is composed of three parameters indicating a position and three parameters indicating an orientation. The force command value is composed of three parameters indicating a translation force and three parameters indicating a moment.

In the present embodiment, the time series data of the position command value is the position teaching data 321 and the teaching data of the force command value is the force teaching data 322. The CPU 301 controls the position and orientation of the robot arm 201 based on the position teaching data 321 and controls a force of the robot arm 201 based on the force teaching data 322. Note that the "position and orientation control" will be referred to as "positional control" hereinafter. Note also that instead of the position command value, the position teaching data 321 may be composed of time series data of an angle command value indicating a target angle of each of the joints J1 through J6 or of an angle command value indicating a target angle of each of the motors 231.

One exemplary feedback control in the positional control will be described. The CPU 301 converts the position command value of the teaching data 320 into the angle command value indicating a target value of an angle of each of the joints J1 through J6. The CPU 301 further converts the angle command value of each of the joints J1 through J6 into an angle command value indicating a target value of a rotational angle of the motor 231 disposed in each of the joints J1 through J6. Then, the CPU 301 outputs the angle command value to the motor 231 of each of the joints J1 through J6 to the servo controller 360 with a predetermined frequency. The servo controller 360 controls an electric current supplied to the motor 231 such that an angle detected by the encoder 253 approaches the angle command value. The position of the tip of the robot arm 201 is brought closer to the position command value by the position control described above.

One exemplary feedback control in the force control will be described. The CPU 301 calculates a torque command value with respect to each of the motors 231 such that a force generated at the tip of the robot arm 201 is equalized with a force command value of the teaching data 320 and outputs the calculated torque command value to the servo controller 360. The servo controller 360 controls an electric current supplied to the motor 231 such that a torque generated in each joint approaches the torque command value based on an angular value of each encoder 253. Each motor 231 generates a driving force by being energized by the current and thereby generates a torque in each joint such that a force is generated at the tip of the robot arm 201. Each encoder 253 outputs a signal indicating an angular value of each motor 231 to the CPU 301. Each torque sensor 252 outputs a signal indicating each torque value to the CPU 301. Thereby, the angular value of each encoder 253 and the torque value of each torque sensor 252 are fed back to the CPU 301. The CPU 301 calculates an angular value of each of the joints J1 through J6 based on a robot model described later and the angular value of the encoder 253. The CPU 301 also calculates a position of the tip of the robot arm 201 based on the robot model and the angular value of each of the joints J1 through J6. The CPU 301 calculates a force generated at the tip of the robot arm 201 based on the angle value of each joint and the torque value of each joint. The force generated at the tip of the robot arm 201 is approached the force command value by the force control described above.

The angle command value and the torque command value outputted from the CPU 301 to the servo controller 360 are drive command values. The CPU 301 can perform the position control and the force control by feedback control by generating the drive command values corresponding to the motor 231 of each of the joints J1 through J6 of the robot arm 201 from the teaching data 320

FIG. 3 illustrates a relationship between a force F1 measured by using the force sensor 251 and a force F2 measured by using the torque sensor 252. An operational force required for the teacher to manipulate the handling portion 203 is denoted by F, and a contact force generated when the hand 202 or a supporting structure supported by the hand 202 comes into contact with the work target object is denoted by f. Note that the plurality of torque sensors 252 is handled all together as one sensor as illustrated in FIG. 3.

As illustrated in FIG. 3, the force sensor 251 and the torque sensor 252 are disposed with an operation point P indicating the handling portion 203 between the sensors. A force F1 measured by using the force sensor 251 is the contact force f itself with the work target object. Meanwhile, a force F2 measured by using the torque sensor 252 is a resultant force of the contact force f and the operational force F (f+F). That is, the contact force f also acts on the handling portion 203 in addition to the operational force F applied by the teacher.

The robot controller 350 can perform force feedback control of changing the drive command value corresponding to the motor 231 of each of the joints J1 through J6 based on the contact force f and the operational force F. More specifically, the robot controller 350 can perform a control of pressing the gripping object to the work target object with a predetermined force by changing the drive command value corresponding to the motor 231 of each of the joints J1 through J6 such that the contact force f becomes a predetermined force. The robot controller 350 also change the drive command value corresponding to the motor 231 of each of the joints J1 through J6 based on an impedance model of information of the operational force F and virtual viscosity and inertia. This arrangement makes it possible for a person to move the robot arm 201 based on the operational force F applied to the handling portion 203. That is, the robot controller 350 performs impedance control on the robot arm 201 such that the robot arm 201 operates following a direction of the operational force F acting on the robot arm 201.

Figure 4:
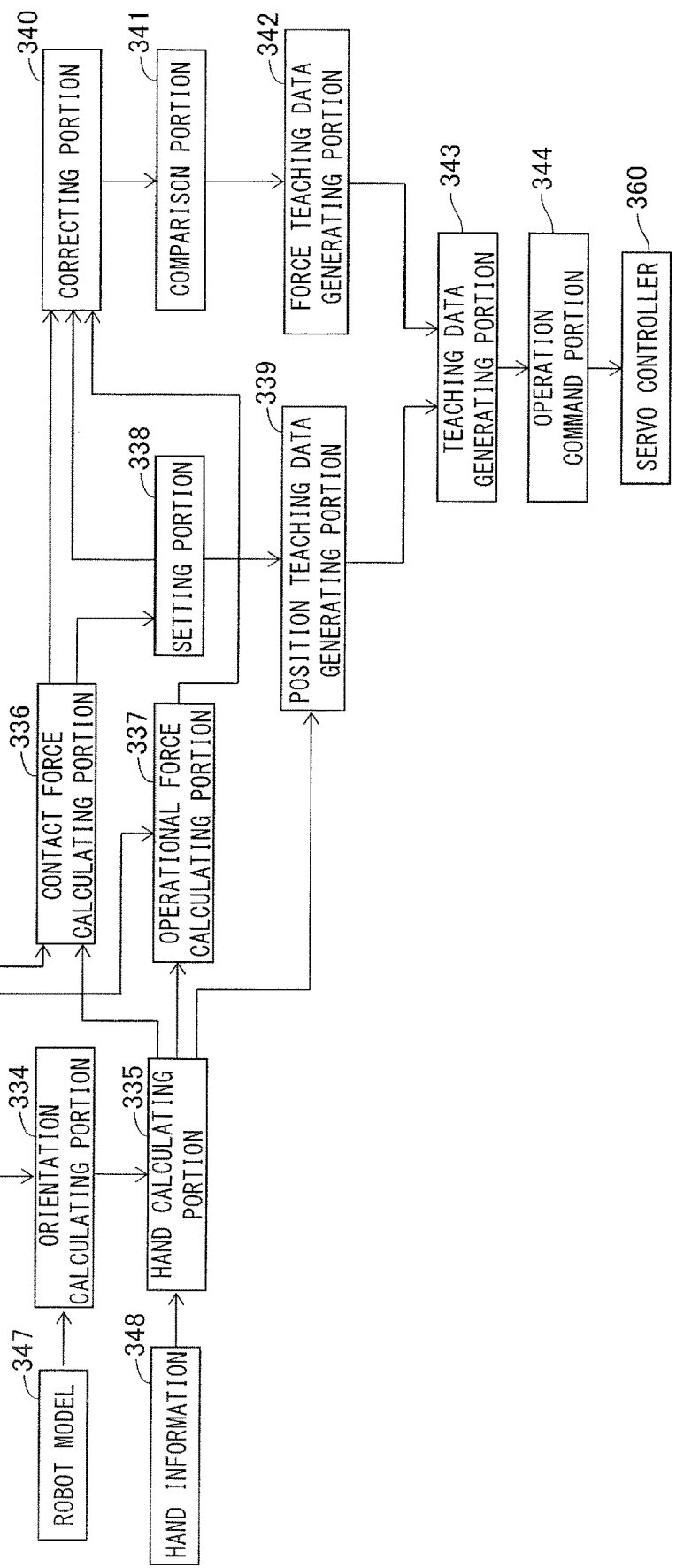
FIG. 4 is a control block diagram of the control system illustrated in FIG. 2.

A case of performing the direct teaching on the robot arm 201 will be described below. FIG. 4 is a control block diagram of the control system 300 in FIG. 2. The CPU 301 illustrated in FIG. 2 functions as each of portions 331 through 344 illustrated in FIG. 4 by executing the program 325. The HDD 304 in FIG. 2 functions as a storage unit 346 in FIG. 4. The robot model 347 is information (data) such as a shape and size of the robot arm 201 and is stored in the HDD 304 in advance. Hand information 348 is information such as a shape and dimensions of the hand 202 and is stored in advance in the HDD 304.

In performing the direct teaching, the robot controller 350 performs the impedance control on the robot arm 201 such that the robot arm 201 operates following a direction of the operational force F acting on the robot arm 201. As the direct teaching, there is also a method of generating teaching data by determining teaching points determined by the teacher by pressing a determination button at main points while manually manipulating the robot arm 201 and by connecting these teaching points. Meanwhile, in the direct teaching of the present embodiment, the robot controller 350 thoroughly acquires a series of operational data generated when the teacher manipulates the robot arm 201 and after the acquisition of the series of time series data, generates the teaching data 320 based on this data. This arrangement makes it possible to improve reproducibility of reproducing the operation of the robot arm 201 that has been taught by the teacher in an automatic operation of reproductively operating the robot arm 201 following the teaching data 320.

The process of generating the teaching data 320 will be described below. When the robot controller 350 is taught, i.e., the robot controller 350 is set in the teaching mode, the robot controller 350 receives signals outputted from the force sensor 251, the torque sensor 252 and the encoder 253 with a predetermined frequency, e.g., 1 [ms]. A first measuring portion 331 measures a first force F1 based on the signal from the force sensor 251, i.e., calculates data of the force F1, and stores the data of the force F1 in the storage unit 346. A second measuring portion 332 measures a second force F2 based on the signals from the plurality of torque sensors 251, i.e., calculates data of the force F2, and stores the data of the force F2 in the storage unit 346. A third measuring portion 333 finds each rotational angle of the plurality of motors 231 based on signals from each of the plurality of encoders 253 and stores the data of each rotational angle of the plurality of motors 231 in the storage unit 346. The data of the force F1, the data of the force F2 and the data of the rotational angles stored in the storage unit 346 are time series data of every 1 [ms] for example. The respective data are synchronized so as to correspond with each other on time base.

An orientation calculating portion 334 calculates an orientation of the robot arm 201 based on the data of the rotational angle of each encoder 253 stored in the robot model 347 and the storage unit 346. The orientation of the robot arm 201 is interpreted as an angle of each of the joints J1 through J6 of the robot arm 201. A hand calculating portion 335 calculates coordinates of the tip of the robot arm 201, i.e., the handling portion 203, based the orientation data and the hand information 348 of the robot arm 201. That is, the orientation calculating portion 334 and the hand calculating portion 335 measure the position of the tip of the robot arm 201 in a time series manner. Note that the measurement of the position of the tip of the robot arm 201 is not limited to the case performed by using the encoder 253. For instance, it may be arranged such that the position of the tip of the robot arm 201 is measured by using a vision sensor disposed around the robot arm 201.

A contact force calculating portion 336 calculates a contact force f from the force F1 measure by using the force sensor 251. In the present embodiment, the force F1 measured by using the force sensor 251 is the contact force f. An operational force calculating portion 337 calculates a differential value (F2−F1) between the data of the force F1 measured by using the force sensor 251 and the data of the force F2 measured by using the torque sensor 252. In the present embodiment, the differential value (F2−F1) is data of the operational force F Thus, it is possible to sample only the data of the operational force F by the differential value (F2−F1).

Based on the measure result of the position of the robot arm 201, the setting portion 338 divides an entire section of the time series data into a first section in which the position of the robot arm 201 is controlled while regenerating the operation and a second section in which the force of the robot arm 201 is controlled while regenerating the operation. In the present embodiment, the setting portion 338 divides the entire section of the time series data depending on whether magnitude of the calculated contact force f is zeroed. More specifically, the setting portion 338 sets the first section where the magnitude of the contact force f is zero and sets the second section in which the magnitude of the contact force f is not zero. It is noted that in the present embodiment, the first section can be said to be a first period in which the control of the position and orientation of the robot arm 201 is made such the data of the position and orientation of the third sensor described above (the encoder 253 in the present embodiment) is regenerated. Still further, the second section can be said to a second period in which the force of the robot arm 201 is controlled such that the first force data and the second force data described above are regenerated. These first and second periods are set by the setting portion 338 based on analytical results of the first and second force data as described above. It is noted that not only executing totally same robot motions but also executing different robot motions, as long as the motions are based on taught robot motions, are included in a conceptual range of the term "regenerate" in the present embodiment. That is, as long as the robot can be appropriately operated by the position control in the first period and the force control in the second period, the operation of the robot may be different from the taught operation.

Figure 5:
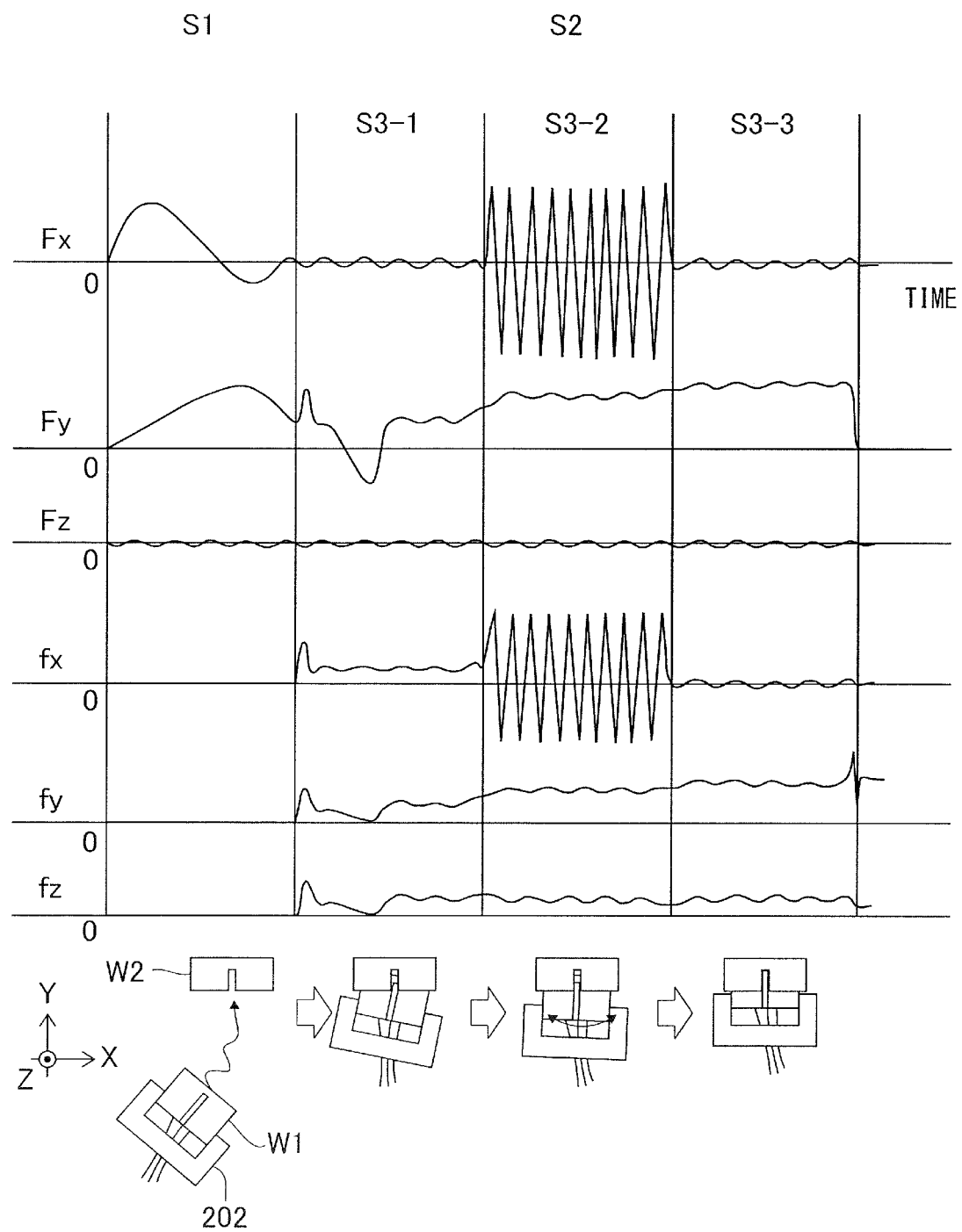
FIG. 5 illustrates time series data of an operational force and a contact force of the first embodiment.

FIG. 5 illustrates the time series data of the operational force and the contact force. FIG. 5 illustrates an assembling operation in which the hand 202 is cause to grip a connector W1 which is one exemplary first part and to assemble the connector W1 with a connector W2 which is an exemplary second part. FIG. 5 also illustrates the operational force and the contact force based on an orthogonal coordinate system of X-Y-Z axes. It is noted that in order to simplify the following description, the operational force will be indicated only by operational forces Fx, Fy and Fz which are translation forces in the X, Y and Z directions. In the same manner, the contact force will be indicated only by contact forces fx, fy and fz which are translation forces in the X, Y and Z directions. The setting portion 338 divides the entire sections during which the time series data is measured into a section S1 which is a first section in which magnitude of the three contact forces fx, fy and fz are all zeroed and a section S2 which is a second section in which magnitude of the three contact forces fx, fy and fz are not zeroed. That is, a case where there is no contact force is the section S1, and a case where there is the contact force is the section S2.

In the section S1, no contact force is generated. That is, the three contact forces fx, fy and fz are zeroed. Specifically, it is a condition before the connectors W1 and W2 come into contact with each other. The operational forces Fx, Fy and Fz fluctuate corresponding to a force applied by an operator to the handling portion 203. What is important in assembling the connectors W1 and W2 is a behavior after when the connectors W1 and W2 come into contact with each other. A locus of the motion and the fluctuation of the force are not important before the connectors W1 and W2 come into contact with each other. The force is divided into the contact force f and the operational force F in the present embodiment. Therefore, it is possible to divide the entire section into the section S1 in which the connectors W1 and W2 are not in contact with each other and the section S2 in which the connectors W1 and W2 are in contact with each other.

Because no contact force is generated as described above before the connectors W1 and W2 are in contact with each other, it is not necessary to perform the force control on the robot arm 201. Accordingly, the position teaching data generating portion 339 illustrated in FIG. 4 generates the position teaching data 321 based on the data of the position of the tip of the robot arm 201 in the section S1. In the present embodiment, the position teaching data generating portion 339 generates the position teaching data 321 by interpolating between two points of data of a position of a starting point and of data of a position of an ending point in the section S1 by a predetermined interpolation method, e.g., linear interpolation and joint interpolation. This arrangement makes it possible to simplify a trajectory on the way and to quicken the motion of the robot arm 201. Note that the position teaching data 321 may be the data itself of the measured time series position. Even in such a case, the motion of the robot arm 201 can be quickened as compared to a case of performing the force control. Still further, because the robot controller 350 automatically divides into the sections S1 and S2 in the present embodiment, the teacher can save a labor. Note that although it is preferable to set two points of starting and ending points to be interpolated as the starting and ending points of the section S1, the present disclosure is not limited to that and the two points may be a point before or after the starting point of the section S1 and a point before or after the ending point of the section S1.

Because a contact force is generated, i.e., either one of the three translation forces fx, fy and fz is not zero in the section S2, it is necessary to perform the force control on the robot arm 201. A force teaching data generating portion 342 illustrated in FIG. 4 generates a 322 such that the robot arm 201 operates with a force (third force) corresponding to the differential value (F2−F1), i.e., the operational force F, during the regenerated operation in the section S2.

A teaching data generating portion 343 connects the position teaching data 321 and the force teaching data 322 generated as described above in a time series manner to generate a teaching data 320 and stores the generated teaching data 320 in the HDD 304 serving as the storage unit. In the present embodiment, the teaching data generating portion 343 composes a generating portion generating the teaching data having the first and second periods described above together with the position teaching data generating portion 339, the force teaching data generating portion 342, the correcting portion 340, the comparison portion 341 and others.

When the regeneration operating mode is set, an operation command portion 344 reads out the teaching data 320 stored in the HDD 304 to generate an operation command value and to output it to the servo controller 360. By regeneratively operating the robot arm 201 in accordance to the force teaching data 322, the motor 231 of each of the joints J1 through J6 generate a torque that generates a force corresponding to the operational force F at the tip of the robot arm 201. This arrangement makes it possible to cause the robot arm 201 to regenerate the same operation with what the teacher (expert) has manipulated the robot arm 201. That is, an operation of the robot arm 201 taught by the teacher can be accurately regenerated at a part where a precision work is necessary among a series of operations of the robot arm 201. That is, it is possible to control the robot arm with a desirable mode based on the operation of the robot arm taught by the teacher.

While the data of the operational force F may be used as the force teaching data 322 as it is, i.e., without correcting the differential value (F2−F1), the series of time series data includes wasteful operations such as hand-shake of the teacher and a preceding operation when a retry operation is made. Then, a correcting portion 340 and a comparison portion 341 correct the data of the operational force F in order to remove wasteful operations. In a case where the data of the operational force F is corrected, the force teaching data generating portion 342 generates a force command value contained in the force teaching data 322 from the corrected data of the operational force F.

A method for generating the force teaching data 322, i.e., the force command value, will be specifically described below. The correcting portion 340 divides the section S2 in which the force control is performed into a plurality of sections S3-1, S3-2 and S3-3.

The S3-1 in FIG. 5 represents a condition right after when the connectors W1 and W2 come into contact with each other. In the section S3-1, the contact forces fx, fy and fz change sharply. After that, the operational force Fy in the Y-direction is remarkably changed, meaning that the teacher tries to move the robot arm 201 in the Y-direction. Noticing the operational force Fy further, although the force is mostly applied in the +Y-direction, the force is applied temporally in the −Y-direction. The teacher intentionally returns the robot arm 201 in the −Y-direction after moving the robot arm 201 once in the +Y-direction. The operational force Fy is stabilized near an end of the section S3-1, indicating a condition in which a constant force is applied in the +yd. The teacher often finds the force required in assembling in such case where the force is stable.

In the section S3-2, the operational force Fx and the contact force fx in the x-direction vary sharply. The directions of the operational force Fx varies frequently, indicating that the teacher is applying the operational force vibrationally to the handling portion 203. Because there is a case where the connectors W1 and W2 can be readily assembled by performing the assembling work while vibrating the connector W1, the teacher intentionally manipulates the handling portion 203 vibrationally in this case. In a case where the direction of the operational force is inverted and is continuous in the data of the recorded force, it is determined to be an intentional operation and the force teaching data 322 is generated without excluding the operational force data during that time. Thus, it is possible to reflect the operation intended by the teacher in regenerating the operation. If the operational force in this condition is simply corrected by moving average or the like, data without change of the operational force is generated, disabling to regenerate the operation intended by the teacher. Note that although the determination has been made by that the direction of the operational force is inverted and is continuous in the abovementioned description, the determination may be made by level of frequency of the inversion of the operational force. Because a response of several KHz or more is not what is manipulated by human, whether a correction is made or not may be decided by providing a threshold value before and after frequency around several Hz of a case where a person intentionally operates the handling portion 203 vibrationally.

In the section S3-3, butting and assembling of the connectors W1 and W2 are completed, and the operational force is vanished after a sharp change of the contact force, indicating that the teaching operation has been finished.

The data of the operational force F, the data of the contact force f and the data of the position are a continuous non-divisional data group. A method for sectioning the section S2 into the plurality of sections S3-1, S3-2 and S3-3 will be specifically described.

Working speed of human tends to be lowered in precision works. Due to that, a section in which the robot arm 201 is operated fast is considered to be an operation which requires no precision or a controlled oscillation. Then, in the present embodiment, the correcting portion 340 analyzes frequency of the data of the operational force F in the section S2 and based on the analyzed result, divides the section S2 into the plurality of sections S3-1, S3-2 and S3-3. Specifically, the CPU 301 performs the frequency analysis on the data of the operational force F and samples out a change point of the frequency to set the change point of the frequency as a point for sectioning the section. This arrangement makes it possible to sample the change point of the operation of the teacher i.e., to divide the section S2 into the plurality of sections by the change point of the operation of the teacher. Note that it is also possible to sample the change point of the operation of the teacher from changes of a main force component of the operational forces Fx, Fy and Fz and from changes of plus and minus of the direction of the respective forces. For instance, if the condition changes from a condition in which the operational force is applied only in the x-direction to a condition in which the force is applied in the y-direction, it can be seen that the teacher has somehow changed the operation intentionally.

Figure 6:
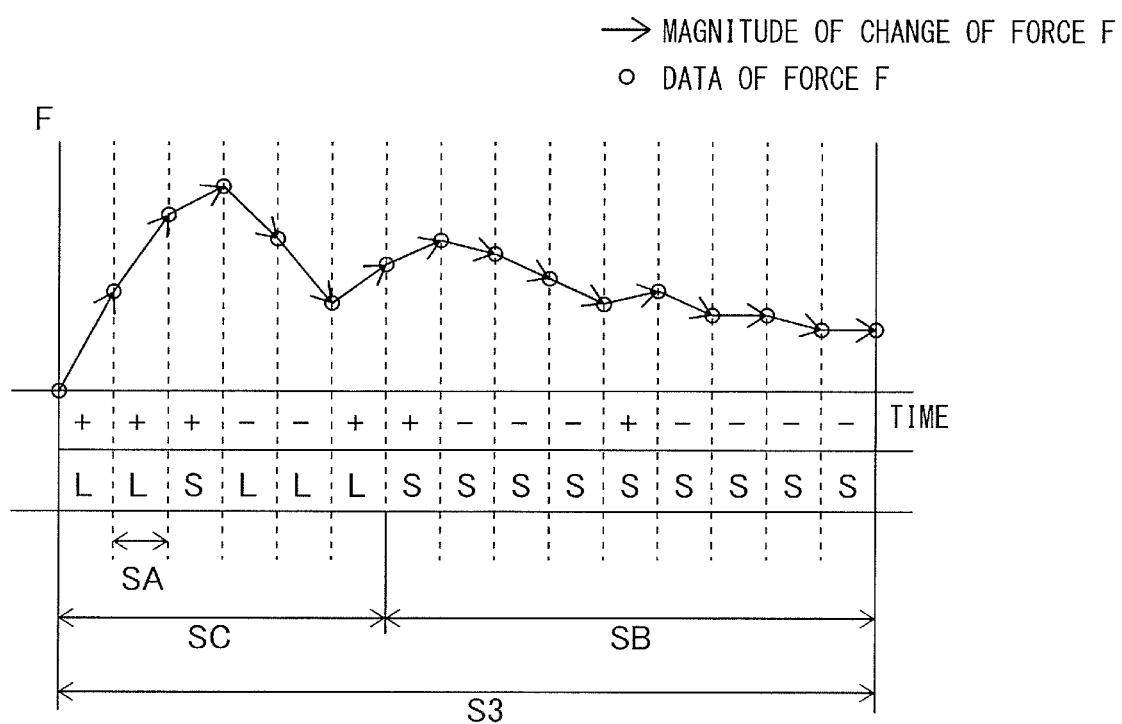
FIG. 6 illustrates a third section of the first embodiment.

The section S3 is one section among the three sections which are sectioned from the section S2. FIG. 6 illustrates the section S3, i.e., the third section. As illustrated in FIG. 6, the CPU 301 divides the section S3 further into a plurality of subsections SA. Each of the subsections SA has a same time interval and is set as data sampling period of 1 [ms] for example in the present embodiment.

The correcting portion 340 finds magnitude of a change of the operational force F at an ending point with respect to a starting point in each of the plurality of subsections SA and stores it in the HDD 304 serving as the storage unit. The magnitude of the change of the operational force F is proportional to an angle of a vector indicated by an arrow in the graph in FIG. 6. A label "S" is given in a case where the magnitude of the change of the operational force F is lower than a threshold value set in advance and a label "L" is given in a case where the magnitude is higher than the threshold value to store by correlating with the data of the magnitude of the change of the operational force F in the HDD 304. Still further, as for the direction of the change of the operational force F, a label "+" is given in a direction away from zero and "−" is given in a direction approaching to zero. As for the stored labels, a section in which subsections SA given the label of "S" continue by a predetermine number set in advance will be denoted as a continuous section SB. Sections other than the continuous section will be denoted as a section SC.

The correcting portion 340 smoothes the data of the operational force F contained in the continuous section SB by an averaging process or the like. That is, the correcting portion 340 smoothes the operational force F applied from the handling portion 203 during teaching for a specific period within the second period set by analysis of the first and second force data. The force teaching data generating portion 342 generates the force teaching data 322 from the smoothed data (operational force). Thus, the correcting portion 340 and the force teaching data generating portion 342 generate the force teaching data 322 such that the force generated in the robot arm 201 is smoothed in the continuous section SB. It is possible to remove wasteful operations such as hand-shake of the teacher by thus smoothing the minute changes.

Figure 7A:
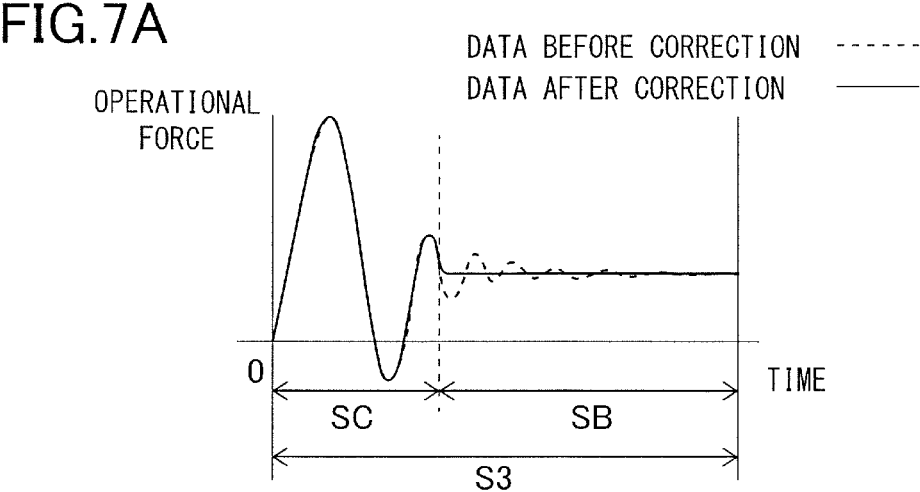
FIG. 7A is a graph indicating data of the operational force in the third section.
Figure 7B:
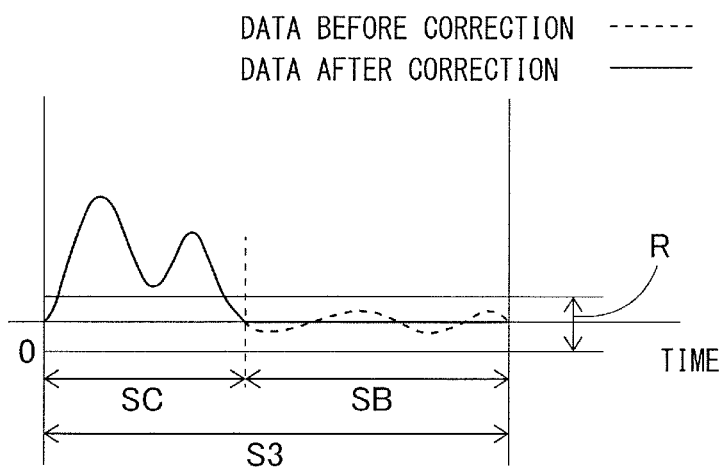
FIG. 7B is a graph indicating data of the operational force in the third section in a case where a condition is different from that in FIG. 7A.
Figure 7C:
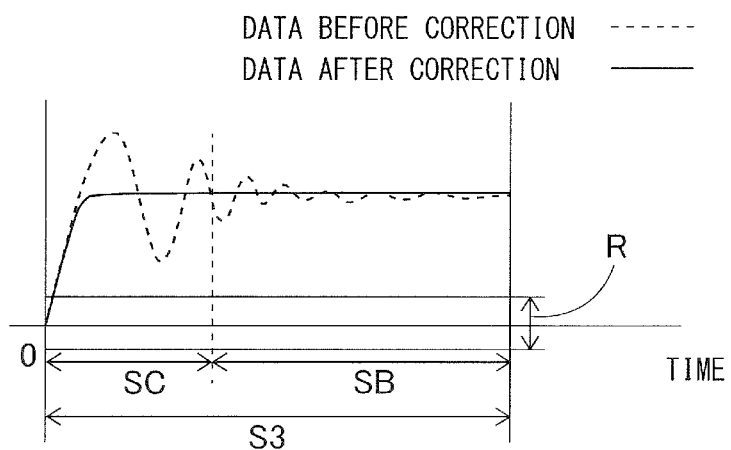
FIG. 7C is a graph indicating data of the operational force in the third section in a case where a condition is still different from that in FIG. 7A.

The correcting portion 340 processes in the section SC other than the continuous section SB as follows. FIGS. 7A, 7B and 7C illustrate the data of the operational force in the section S3. A broken line indicates the data of the operational force F before correction and a solid line indicates the data of the operational force F after the correction. A portion in which the broken line overlaps with the solid line indicates that the data of the operational force F is not corrected.

In a case where the operational force F crosses zero as illustrated in FIG. 7A, the correcting portion 340 does not correct the data of the operational force F. Therefore, the force teaching data generating portion 342 sets the data of the operational force F as the force teaching data 322 as it is. It is because there is a possibility that the teacher intentionally vibrates the robot arm 201 when the plus and minus of the operational force is inverted. Here, the data of the operational force F crosses zero means that plus and minus signs of the data of the operational force F are switched.

Even in a case where the operational force F does not cross zero in the section SC as illustrated in FIG. 7B, the correcting portion 340 does not correct the data of the operational force F in a case where the operational force F at the end point of the continuous section SB exists within a predetermined range R including zero. Therefore, the force teaching data generating portion 342 sets the data of the operational force F as the force teaching data 322 as it is. It is because in a case where the operational force F is in the vicinity of zero in the continuous section SB, force teaching zero data in which the operational force is all ignored is generated if the force teaching data is generated by smoothing the data. In order to avoid that, the data of the operational force F is not corrected in the section SC in a case of FIG. 7B.

The correcting portion 340 corrects and smoothes the data of the operational force F in a case where the operational force F does not cross zero as illustrated in FIG. 7C and where the operational force F at the ending point of the continuous section SB exists outside of the predetermined range R including zero. Specifically, in the section SC, the correcting portion 340 smoothes the data of the operational force F at a latter half section, with respect to a former half section, heading to the same operational force with the starting point of the continuous section SB. The force teaching data generating portion 342 generates the force teaching data 322 from the corrected data of the operational force F Here, the section SC is a set of subsections before the continuous section SB. Thereby, the correcting portion 340 and the force teaching data generating portion 342 generate the force teaching data 322 such that the force (third force) generated by the robot arm 201 in a section before the continuous section SB is smoothed in the present embodiment. In a case of FIG. 7C, the force teaching data 322 is generated such that the operational force F increases with a largest inclination of the force vector in the former half of the section SC and the force teaching data within the continuous section SB is set as a final command value within the latter half of the section SC. This arrangement makes it possible to remove fluctuations of the force during when the teacher makes trial and error and to reflect a result of the final operational force from the beginning.

Next, a process of the comparison portion 341 will be described. FIG. 8 illustrates a case when a retry operation is made in teaching connection of connectors. In a case where connectors W1 and W2 illustrated in FIG. 8 are connected with each other and in a case where a flexible object W such as a flexible flat cable is gripped by the hand 202, the flexible object W deforms largely or an orientation of the connector W1 is shifted largely with respect to an assembling direction if an excessive force is applied. In such a case, the teacher performs an operation of returning to an original position and performs the retry operation to adjust the force to be applied.

Figure 9:
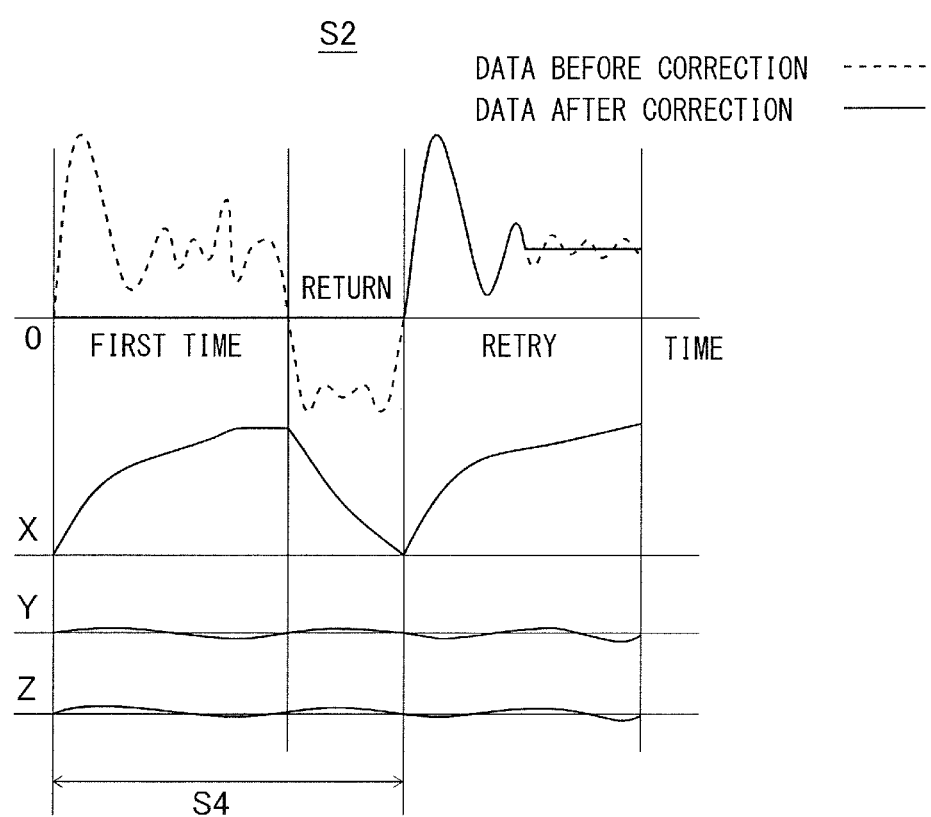
FIG. 9 illustrates a processing of a comparison portion illustrated in FIG. 4.

FIG. 9 illustrates the process of the comparison portion 341. As illustrated in FIG. 9, a value of position data when the return operation is finished is equal with a value of position data before the assembling work is made. Accordingly, in a case where the retry operation in the latter half is made, the operations in the former half are all unnecessary.

Then, in the present embodiment, the comparison portion 341 removes data between the two time series position data having the equal values and removes the operational force data synchronized with the removed position data out of the time series operational force data. In other words, the comparison portion 341 refers to the position data synchronized with the operational force data corrected by the correcting portion 340 to determine whether there is similar time series position data. In a case where there is the similar time series position data, the comparison portion 341 removes the similar time series position data together with synchronized force teaching data. The force teaching data generating portion 342 generates the force teaching data 322 from the operational force data partially removed. Thus, the comparison portion 341 and the force teaching data generating portion 342 generate the force teaching data 322 such that the operations of the robot arm 201 between the two position data assuming the equal value among the time series position data in the section S2. Here, the "equal value" includes a case where the position data shift with each other within a tolerance set in advance in the storage unit such as the HDD 304. For instance, in a case where the tolerance is set at 0.1 [mm], values of coordinates X: 200.0 [mm], Y: 200.0 [mm] and Z: 200.0 [mm] are considered to be equal with values of coordinates X: 199.9 [mm], Y: 200.0 [mm] and Z: 200.0 [mm]. Note that in a case where the operation of the robot arm 201 between the two position data is omitted, it is preferable to omit an operation corresponding to either one position data among the two position data and to leave an operation corresponding to the other position data. In the case of FIG. 9, operations in a section S4 during which the assembling work is failed is omitted. That is, the generating portion (341, 342) determines whether the retry operation is made in teaching the robot arm based on the position and orientation data acquired by the third sensor and in a case where the determination is made such that the retry operation has been made, generates the teaching data so as not to regenerate failed operations. Thus, it is possible to remove the wasteful operation effectively by making the data processing together with the position data.

Figure 10:
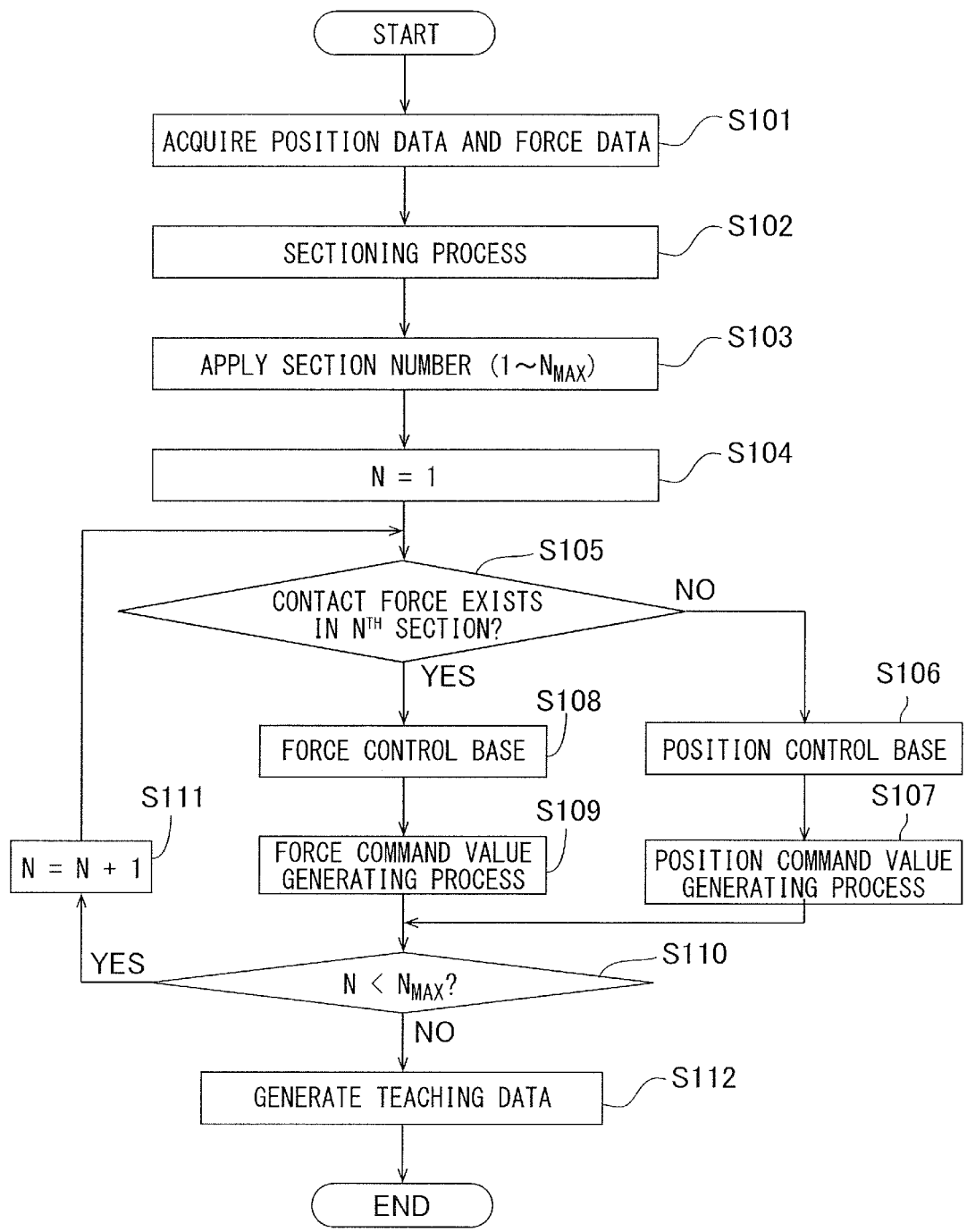
FIG. 10 is a flowchart illustrating one exemplary robot teaching method of the first embodiment.

The operations of the robot controller 350 have been described above along the block diagram illustrated in FIG. 4. FIG. 10 is a flowchart summarizing the series of the processes of the robot controller 350. That is, FIG. 10 is a flowchart illustrating one exemplary robot teaching method of the first embodiment.

At first, the CPU 301 acquires the time series position data, the operation force data and the contact force data of the robot arm 201 at the time of teaching in Step S101. Note that the CPU 301 reads the sectioning setting of the sections of the teaching data set manually in advance, the threshold value in labelling the subsection, the setting in determining similarity of the position data and others.

Next, the CPU 301 performs the sectioning process in accordance to the setting reading each data during teaching in Step S102. Specifically, the CPU 301 divides as the sections S1, S3-1, S3-2, and S3-3 and so on as illustrated in FIG. 5.

The CPU 301 applies section numbers 1 through $N_{max}$ to the sectioned data in a time series manner in Step S103. After that, the CPU 301 generates the teaching data per each section. The CPU 301 defines a section processing number N and sets as N=1 at first in Step S104.

The CPU 301 determines whether there exists a contact force in an $N^{th}$ section in Step S105. If there is no contact force, i.e., No in Step S105, the CPU 301 executes, based on a position control in Step S106, a process of generating a position command value in Step S107. In Step S107, the CPU 301 connects positions of starting and ending points of the $N^{th}$ section by a predetermined interpolation method, i.e., corrects the position data to generate the position command value. That is, the CPU 301 serving as the generating portion generates the position teaching data regenerating the first period (first section) by interpolating between the two points of the position and orientation data acquired by the third sensor by the predetermined interpolation method.

In a case where there exists the contact force, i.e., YES in Step S105, the CPU 301 executes. Based on the force control in Step S108, a process of generating a force command value in Step S109. After generating the position command value or the force command value, the CPU 301 determines whether $N<N_{max}$ in Step S110. In a case where $N<N_{max}$, i.e., YES in Step S110, the CPU 301 increments N by one in Step S111 and returns to the process in Step S105. In a case where $N=N_{max}$, the CPU 301 generates the teaching data 320 in which command values of the entire sections are arrayed in a time series manner in Step S112.

The process in Step S109 in FIG. 10 will be specifically described below. FIG. 11 is a flowchart illustrating the force command value generating process. The CPU 301 determines whether there is a similar part in the position data in Step S121. In a case where there is a similar part, i.e., YES in Step S121, the CPU 301 executes a deleting process of deleting the position data of the part determined to be similar except of final data of the similar part together with the force data in the same time series in Step S122.

Next, the CPU 301 further divides of data of the $N^{th}$ section per sampling frequency of the force sensor to define as subsections in Step S123. Then, the CPU 301 applies numbers 1 through $n_{max}$ to the respective subsections in Step S124. Note that the CPU 301 determines whether magnitude of a change of the operational force data in the subsection is large or small by a threshold value and applies a label. At this time, the CPU 301 sets a group of subsections in which the subsection having a small change continues as a continuous section.

The CPU 301 defines a subsection processing number n and sets as n=1 at first in Step S125. The CPU 301 determines whether a subsection of the $N^{th}$ section is a continuous section in Step S126. If it is the continuous section, i.e., YES in Step S126, the CPU 301 generates a smooth force command value by implementing an averaging process on the operational force data in Step S127.

In a case where it is not the continuous section, i.e., NO in Step S126, the CPU 301 determines whether the operational force F crosses zero in Step S128. If the operational force F crosses zero, i.e., YES in Step S128, the CPU 301 generates the force command value without processing the operational force data. In a case where the operational force F does not cross zero, i.e., NO in Step S128, the CPU 301 executes data processing of the operational force in Step S129. In a case where the continuous section exists in the $N^{th}$ section as described above, the CPU 301 generates a force command value targeting a value in starting the continuous section.

Then the CPU 301 then determines wither $n<n_{max}$ in Step S130. In a case where $n<n_{max}$, i.e., YES in Step S130, the CPU 301 increments n by one in Step S131 and returns to the process in Step S126. In a case where $n=n_{max}$, i.e., NO in Step S130, the CPU 301 shifts to the process in Step S110 in FIG. 10.

While the assembling operation of assembling the connectors W1 and W2 illustrated in FIG. 5 with each other has been described above, there is also a case of causing the robot arm 201 to perform an exploring operation for example as a work to be performed by the robot 200.

There is a case where a human performs an assembling work by sense of hands without relying on eyesight. After visually setting a rough target position, that person carries out the assembling work by relying on the sense of hands. Because it is considered to be more efficient to find an assembling method of settling a part into a certain condition while abutting the part at a rough position and while pressing the part in a certain direction rather than assembling the part while correcting the target position visually corresponding to the part. The same applies to the assembling works using the robot 200.

Figure 12A:
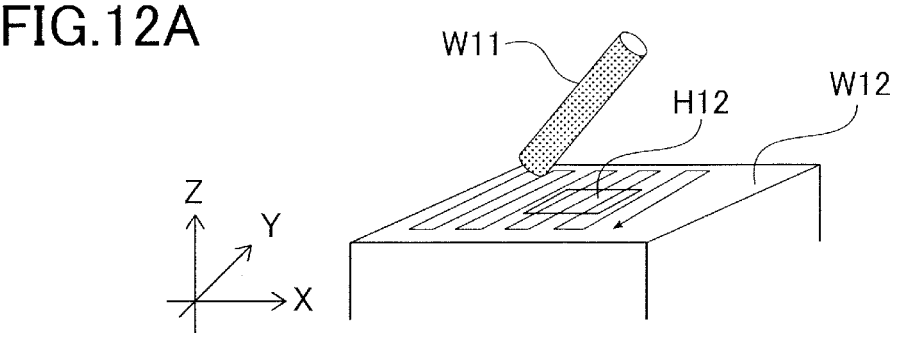
FIG. 12A illustrates how an exploring operation of the robot arm of the first embodiment is taught.
Figure 12B:
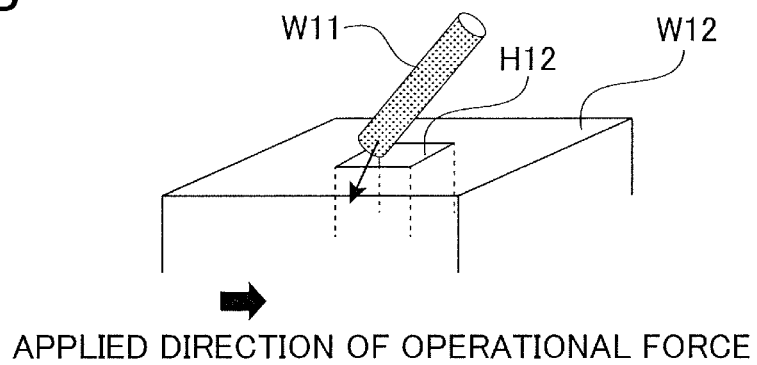
FIG. 12B illustrates a condition in which a work comes near an insertion hole in the exploring operation of the robot arm.
Figure 12C:
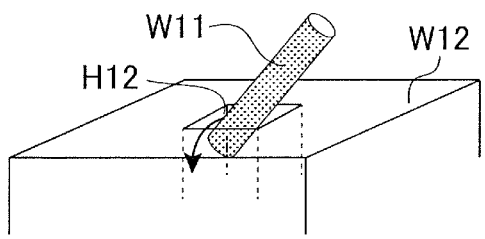
FIG. 12C illustrates a condition in which the work enters the insertion hole.
Figure 12D:
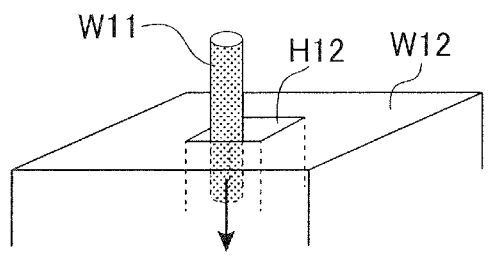
FIG. 12D illustrates a condition in which the work enters the insertion hole further from the condition in FIG. 12C.

FIGS. 12A through 12D illustrate an exploring operation in teaching the robot arm. Axes in directions along an upper surface of the workpiece W12 are denoted as X and Y and an axis in a direction orthogonal to the X and Y directions is denoted as Z. As illustrated in FIG. 12A, the robot arm is caused to perform the exploring operation (search position) in inserting a rod workpiece W11 into an insertion hole H12 of the workpiece W12. An insertion position is explored in the X and Y directions while abutting the work W11 gripped by the hand with the upper surface of the workpiece W12, i.e., the target of insertion, and while pressing against the upper surface with a certain force in the Z direction. In a case where the workpiece W11 comes near the insertion hole H12 as illustrated in FIG. 12B, the person senses a change of the contact force, changes the operational force and advances the assembling work to next stages as illustrated in FIGS. 12C and 12D. In a case where there is a change of the contact force during when the operational force changes, an assembling operation that enables to absorb a gap or the like is regenerated by setting the change of the contact force in a step enabling condition of the operation. However, in a case where although the operational force continuously fluctuates but the contact force does not change or changes less like the exploring operation (position search), a process different from the conventional one is required. Although the assembling operation can be regenerated by setting the change of the contact force as the step enabling condition of the operation in a case where the gap during the regenerating operation exists within an operational range into which the workpiece W11 comes near the insertion hole H12, it is unable to regenerate the operation when the gap of the parts exists outside of the operational range during teaching. As for the exploring operation, it is necessary to complement the operation from the time of teaching so as to be able to deal with the gap of the parts.

Then, according to the present embodiment, the CPU 301 judges such an operation in which the contact force does not change or changes less even though the operational force continuously fluctuates as the exploring operation and complements the regenerating operation from a tendency of the operation. FIG. 13 illustrates a specific example of complementing a trajectory. FIG. 13 illustrates three exploring operations α, β and γ. That is, the CPU 301 can deal with the gap or the like of the parts and improve versatility by analyzing the tendency of the exploring operation from displacements of the respective coordinates until reaching to the insertion hole H12, i.e., until when the contact force changes, and by complementing the operation not included at the time of teaching.

Second Embodiment

Figure 14:
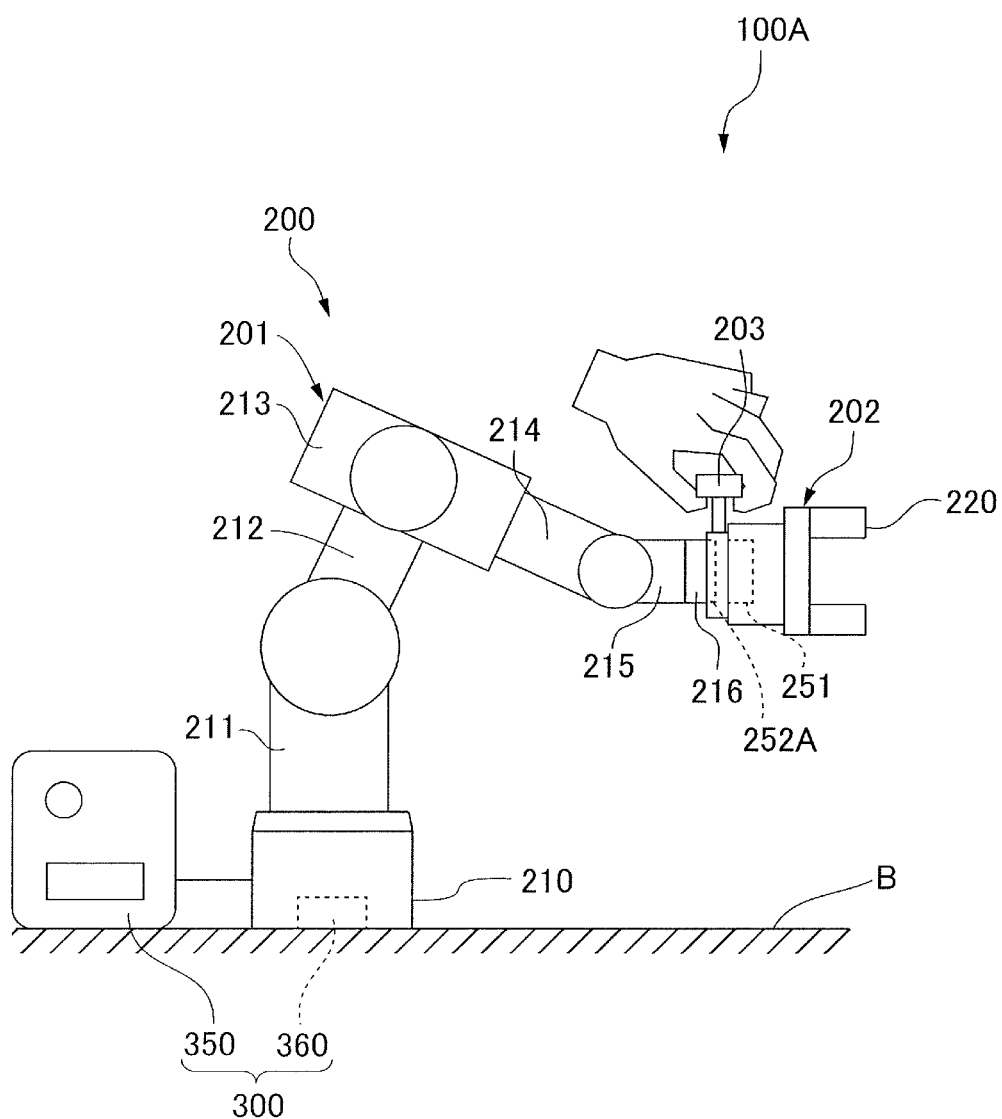
FIG. 14 illustrates a robot system of a second embodiment.

FIG. 14 illustrates a robot system 100A of a second embodiment. In the first embodiment, the case where the second sensor is the plurality of torque sensors and is disposed in each of the joints of the robot arm 201 has been described. In the second embodiment, the second sensor is the force sensor 252A. Preferably, the force sensor 252A is disposed between the tip of the robot arm 201 and the handling portion 203. In the present embodiment, the force sensor 252A is built in the handling portion 203. The 252A is constructed in the same manner with the force sensor 251. The force sensor 252A a signal corresponding to a force applied to the handling portion 203 to the robot controller 350 with a predetermined frequency. Similarly to the first embodiment, the operational force F can be calculated by subtracting a force F1 measured by using the force sensor 251 from a force F2 measured by using the force sensor 252A also in the second embodiment.

Third Embodiment

Figure 15:
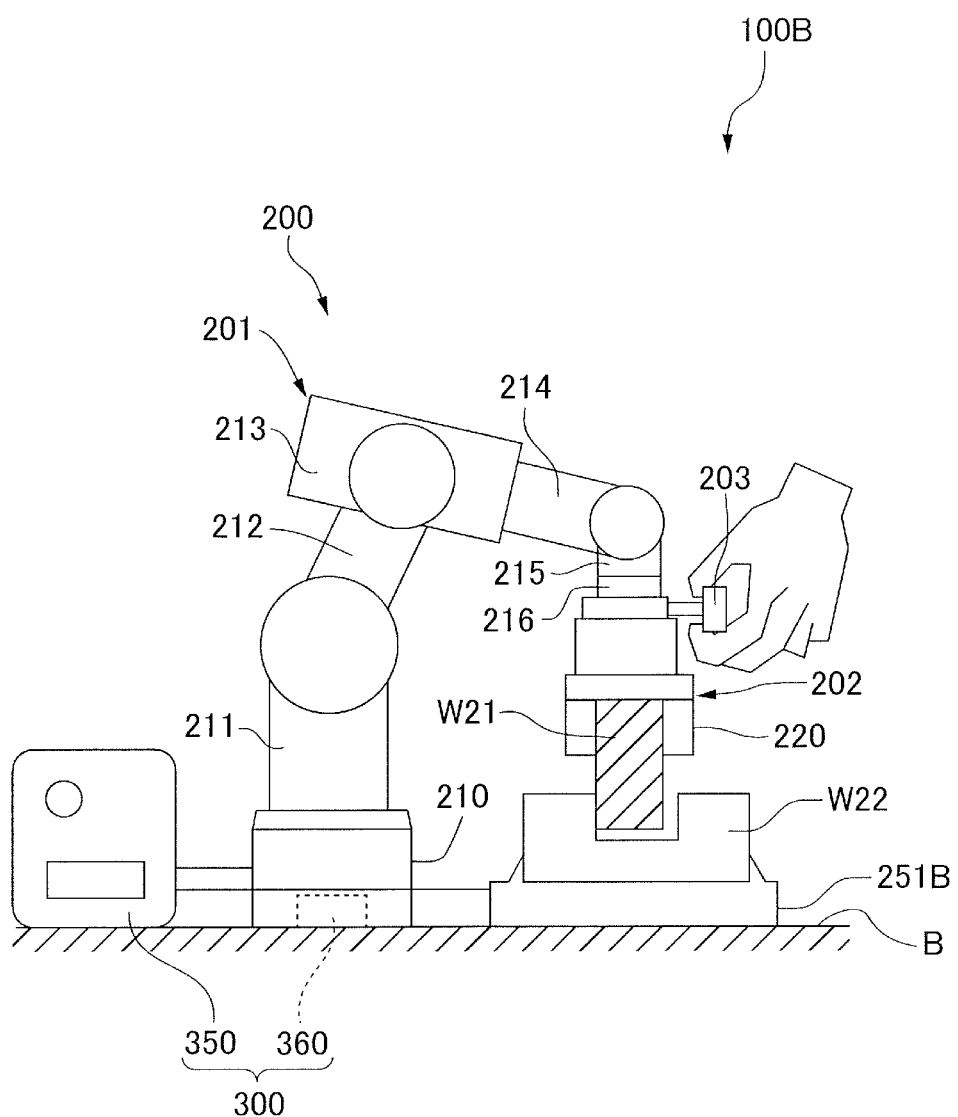
FIG. 15 illustrates a robot system of a third embodiment.

FIG. 15 illustrates a robot system 100B of a third embodiment. The case where the force sensor 251 serving as the first sensor is mounted in the robot 200 has been described in the first embodiment. In the third embodiment, the first sensor is a force sensor 251B provided on the base B on which a work target object W22 is placed. The force sensor 251B is configured in the same manner with the force sensor 251 described in the first embodiment.

In a case where the hand 202 grips the work W21, the WS21 comes into contact with the work target object W22. A contact force at this time acts on the force sensor 251B. The force sensor 251B outputs a signal corresponding to the force which has acted on itself to the robot controller 350 with a predetermined frequency. Thus, the robot controller 350 can measure the contact force by using the force sensor 251B.

Fourth Embodiment

Figure 16:
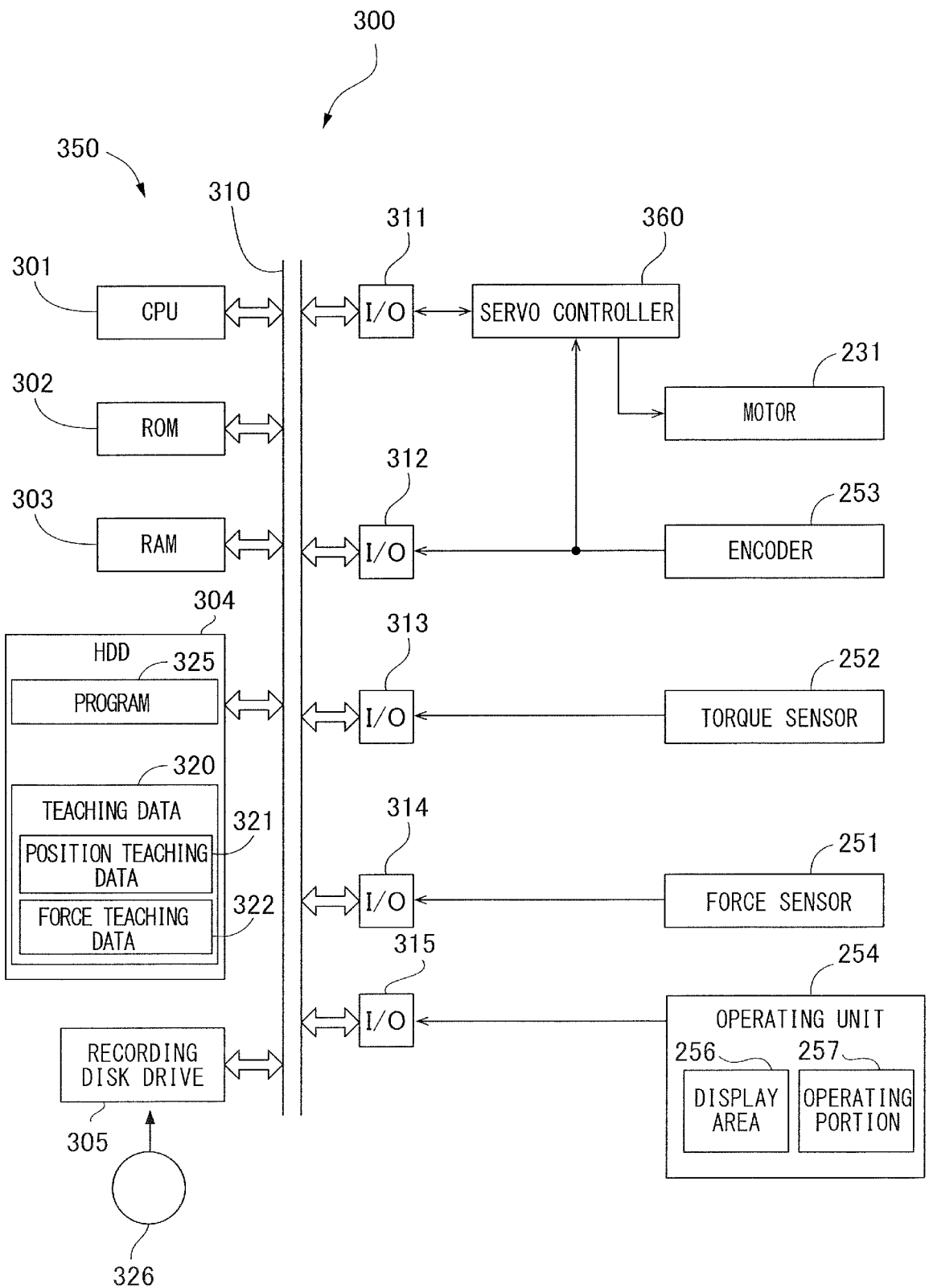
FIG. 16 is a block diagram illustrating a control system of a robot system of a fourth embodiment.

Next, a fourth embodiment will be described with reference to FIGS. 16 through 18B. In the fourth embodiment, only points different from the first embodiment will be described and the same configuration with the first embodiment will be denoted by the same reference numerals and description thereof will be omitted here. FIG. 16 is a block diagram illustrating a control system of a robot system of the fourth embodiment. As illustrated in FIG. 16, the operating portion 254 is connected with the bus 310 through an I/O 315. That is, the operating portion 254 is connected with the robot controller 350 and is arranged to be able to acquire position and orientation information of the robot 200 and force sensor information from the force sensor 251, the torque sensor 252 and others through the robot controller 350.

Figure 17:
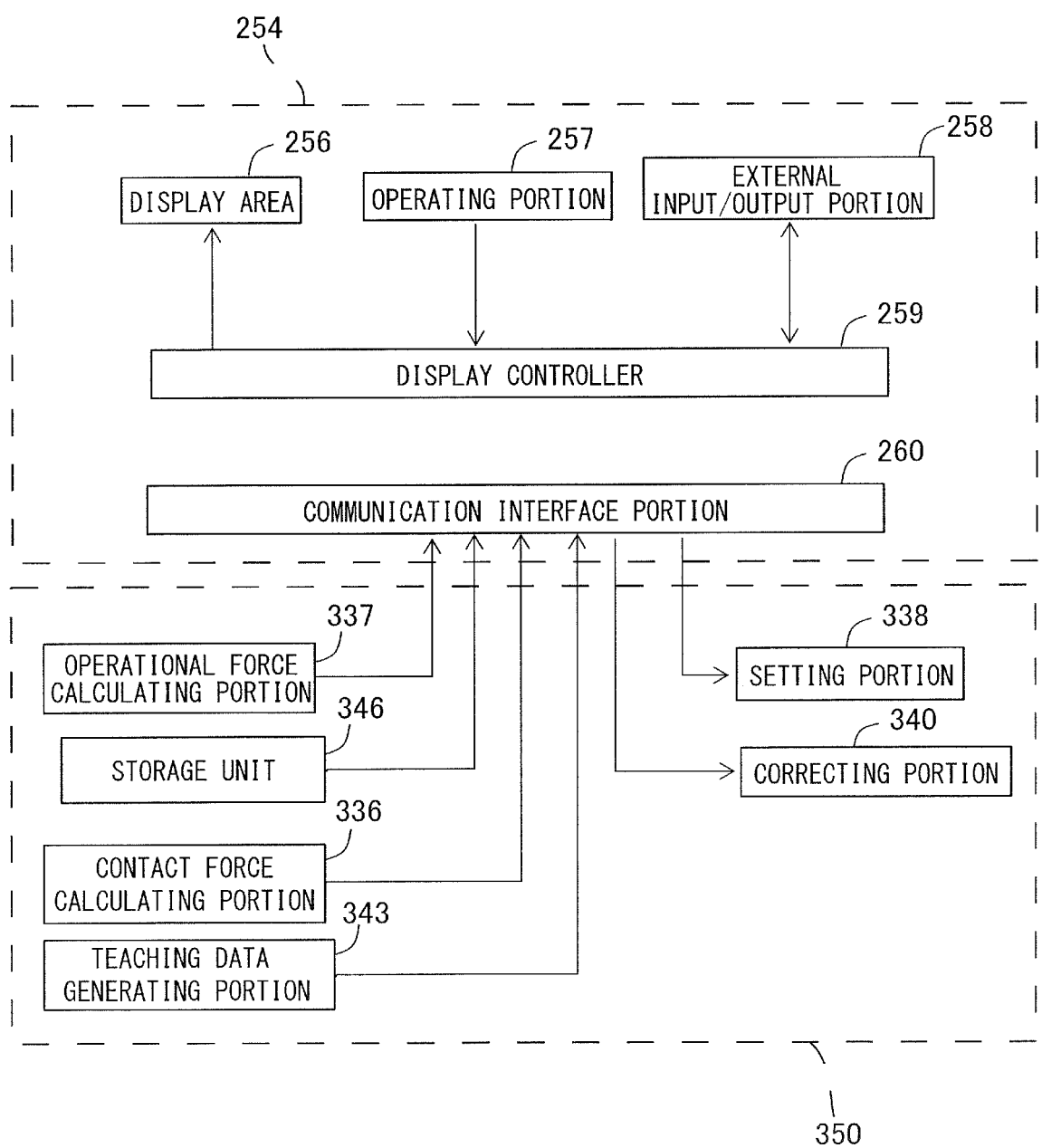
FIG. 17 is a control block diagram of the control system in FIG. 16.

As illustrated in FIG. 17, the operating portion 254 includes a display area 256, an operating portion 257, an external input/output portion 258, a display controller 259 and a communication interface portion 260. The operating portion 254 processes data acquired from the robot controller 350 to display on the display area 256 and to inform of change of state of the operating portion 257 to the robot controller 350. Here, the operating portion 257 is a control portion controlling so as to be able to perform a change operation on the display information displayed on the display area 256 by receiving an operation from a user (teaching operator). An external input/output portion 258 is an interface for inputting/outputting an arbitral sensor signal, a trigger signal and others from/to the outside. The display controller 259 is an output portion for outputting display information corresponding to the teaching data generated by the teaching data generating portion 343 on a display area. The display controller 259 displays the display information as time series information discernible as the first section (first period) and the second section (second period) on the display area 256.

Next, a configuration of the display area 256 will be described in detail. The display area 256 renders the screen and displays data at the time of teaching as illustrated in a teaching data confirmation screen in FIG. 18A. The teaching data confirmation screen may be displayed always on the display area 256 or may be switched as another screen by making transition of the screen. The position information of the robot 200 and the force sensor information of the robot 200 at the time of teaching are displayed as time series data (time series raw data) in the teaching data confirmation screen. The position information and the teaching data automatically generated from the force sensor information are also displayed together with the time series (time series teaching data). It is possible to discriminate and to confirm a region in which an intention of the operator is faithfully reflected and a region in which omission, smoothing and deletion are made by comparing the time series raw data thus obtained with the time series teaching data as the generated teaching data. The display area 256 may be also arranged such that the teaching data can be corrected while confirming the display. Note that although the data are displayed in upper and lower graphs in FIG. 18A for convenience, the data may be displayed by overlapping the graphs with each other.

The time series raw data is automatically sectioned and split as described above, and data processing is executed corresponding to a feature per each section to generate the teaching data. The section is split at least in unit of a first section (first period) and a second section (second period), and the operating portion 257 can execute selection and change operations independently in these split sections. More specifically, according to the present embodiment, the first and second sections are subdivided further and are displayed by the section split described above. That is, a first subsection (first subsection) in which the first section is subdivided further and/or a second subsection (second short period) in which the second period is subdivided further are displayed on the display area 256, and these first and second subsection are arranged such that selecting and changing operations respectively independently. It is noted that although the present embodiment is arranged such that first and second sections are automatically split into the subsections, it is also possible to arrange such that those sections are manually split into the subsections, and naturally, these subsections may be arranged so as to be selected, edited or deleted.

On the teaching data confirmation screen, the time series raw data and the time series data are displayed respectively such that divisions of the sections are discernible. In a case where the buttons provided on the operating portion 257 and the display area 256 of the operating portion 254 are formed in the touch panel, the split section can be selected by directly clicking the screen. The selected section is indicated by being displayed by half-tone dot meshing, by reversing, by another color and the like such that it can be seen that the section has been selected to enable to select and to specify a method for generating the teaching data in the selected section. However, such information that indicates how the teaching data has been generated from the time series raw data without the selection of the section may be always displayed.

Still further, if a certain section is selected, a selection UI is displayed to enable to select a desirable process among various processes set in advance. For instance, it is possible to reselect a teaching data generating method such as averaging process, linear approximation, zero-valued, omission, generation of fastest trajectory, no-correction (teaching data is faithfully regenerated) or the like to regenerate the teaching data. In a case where the teaching data generating method is reselected, a confirmation screen questioning if the teaching data is to be regenerated is displayed. However, the regeneration may be automatically performed without the confirmation screen questioning if the teaching data is to be regenerated. In a case where the teaching data is regenerated, the time series teaching data is updated and displayed on the display area 256. That is, if a changing operation on the display information being displayed on the display area 256 is executed through the operating portion 257, the teaching data is updated based on the changing operation described above by the display controller 259 serving as an updating portion. The confirmation screen of the reselection and regeneration of the teaching data generating method may be made by displaying a popup screen or selecting by the button or the like allotted to the operating portion 257.

In the case where the button provided on the operating portion 257 and the display area 256 of the operating portion 254 are rendered as the touch panel, it is also possible not only to select the section but also the division itself of the section described above by directly clicking the screen. It is also arranged such that a move of the division of the section automatically processed and generated on the time base, deletion and addition of the division can be made and such that the time width of the section can be changed. The selection of the division of the section is made by the same manner in selecting the section described above. As for the addition of the division, an additional screen may be popped up by selecting a place where there is no division on the screen or may be made by the button allotted to the operating portion 257. Note that in a case where the display area 256 is rendered in the touch panel, the operating portion 257 is configured integrally with the display area 256. Still further, the changing operation described above is arranged to be executable based on the button on the operating portion 257 or the operation of the touch panel. In addition to that, the button or the switch on the operating portion 257 may be physical button and/or switch or may be button/switch displayed as images on the touch panel.

Figure 18A:
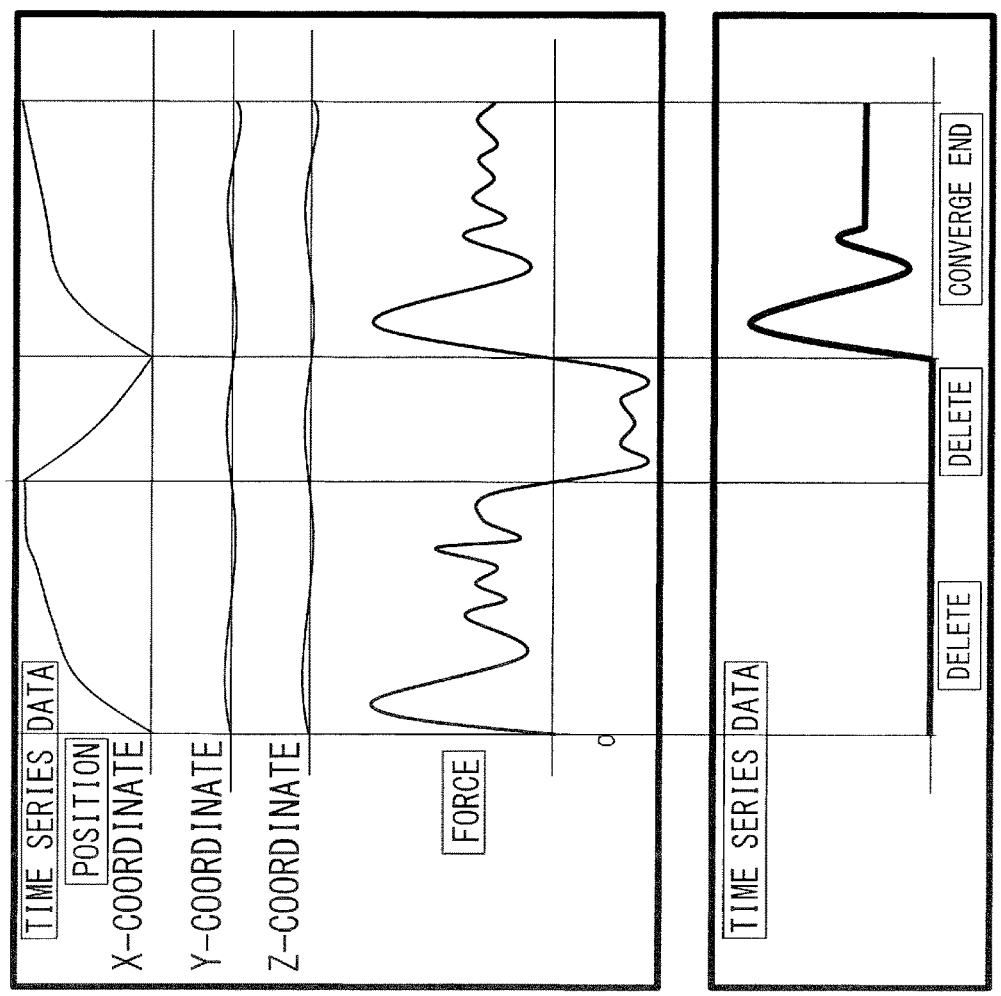
FIG. 18A is a schematic diagram illustrating a display area of a manipulator.
Figure 18B:
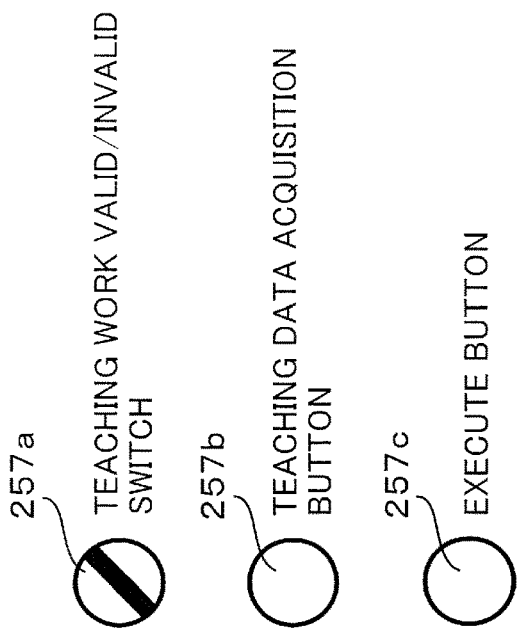
FIG. 18B is a schematic diagram illustrating a manipulation portion of the manipulator.

In succession, the configuration of the operating portion 257 will be described in detail with reference to FIG. 18B. Note that the operating portion 257 will be described as an example of a button displayed on the display area 256 on the operating portion 254 in FIG. 16, it may be a physical button provided on the operating portion 254.

The operating portion 257 includes a teaching valid/invalid switch 257a for switching whether a teaching work is valid or invalid, and when the teaching valid/invalid switch 257a is valid, the time series raw data is updated and displayed. Although the time series raw data may be always updated and displayed on the display area 256, the teaching valid/invalid switch 257a is provided for a purpose of avoiding a load of the controller from increasing due to drawing or the like which are unnecessary, other than the teaching works. While a period during which the update and display is made can be set arbitrarily in advance, the period should be set appropriately by the operator because data display density increases it becomes hard to watch by the operator if the period is too long.

The operating portion 257 also includes a teaching data acquisition button 257b and is arranged such that the time series raw data being displayed is reset and the display can be made from the beginning by operating the external input/output portion 258b. That is, the operating portion 257 realizes the function of the teaching data acquisition button 257b by a selecting portion enabling to select whether the first and second force data can be acquired in operating the handling portion 203. In a case where the teaching data acquisition button 257b is pressed down or the teaching data acquisition button 257b is released, the robot stops right away at that position. The teaching data acquisition button 257b may be also provided in the handling portion 203 of the robot side.

The operating portion 257 also includes an execute button 257c that regenerates and operates the time series teaching data, and when the execute button 257c is pressed, the robot 200 (the robot arm 201) operates based on the selected time series teaching data.

Next, a flow at a time of teaching will be explained in detail. Teaching of the robot 200 is started by validating the teaching valid/invalid switch 257a. When the teaching valid/invalid switch 257a is validated, the time series raw data is displayed on the display area 256 of the operating portion 254 for an arbitral period set in advance. Then, the teaching operator advances the examination such as the assembling works of the workpieces while watching the time series raw data. Then, when the examination reaches a state in which the trial and error operation is finished and the teaching data is to be actually generated, the teaching operator presses the teaching data acquisition button 257b to start to accumulate the time series raw data.

The accumulated time series raw data is displayed in split in the plurality of sections as described above, and the teacher can select or delete the data even when the teaching work is evaluated. It is possible to acquire the teaching data again from a beginning of a deleted section and to connect the teaching data by pressing the teaching data acquisition button 257b in a condition in which the deleted section is selected.

However, in a case where there is a difference more than a threshold value set in advance between final time series raw data (the position and orientation information in particular) of a section right before the deleted section and time series raw data acquired again, an alarm is indicated to avoid the connection of the data. It is also possible to provide a function of assisting the operator such that the data can be appropriately connected. For instance, it is a function of automatically operating at low speed so as to trace the section right before the deleted section and of informing the operator of an arrival when the tracing operation reaches in a vicinity of a final part of the section. In this case, the operator presses the teaching data acquisition button 257b to continue the teaching works after receiving the notification. Also, there may be a function of assisting in the same manner as described above concerning the connection with the next section right after the deleted section and of automatically interpolating to position and orientation at a beginning of the next section right after the deleted section at a moment of time when the teaching data acquisition button 257b is released. That is, what is important is not to generate a sharp change of the position and orientation at the connecting part of the teaching data. However, it is necessary to be careful because the continuity of the force information is lost.

When the teaching data acquisition button 257b is pressed, the time series teaching data is automatically generated from the acquired time series raw data and is displayed on the display area 256 of the operating portion 254. The operator confirms the displayed time series teaching data, edits appropriately and stores the teaching data.

Next, the teaching data regenerating operation will be described. The teaching data is regenerated by pressing the execute button 257c. The operator arranges various conditions in executing the teaching works such as an initial position of an assembly target object and an initial position and orientation of the robot for example and presses the execute button 257c. A position on the time base is displayed in the time series teaching data on the display area 256 of the operating portion 254 such that a part being regenerated can be seen. For example, it is such an indication or highlighted indication that a bar vertical to the time base moves with an elapse of time. This arrangement makes it possible for the operator to confirm a successful or problematic part in the teaching work and to edit the teaching data more readily.

It is possible to manage the time series raw data and the time series teaching data in the storage unit of the robot controller 350 as set data such that they can be read again and to be edited again from the operating unit 254, and an arbitral file name may be given to the teaching data to be stored. The abovementioned operation may be executed by the teaching pendant for teaching the robot or may be executed by a predetermined application on an arbitrary computer.

With the functions described above, it is possible to simply and readily execute the automatic generation and the correction of the teaching data. Therefore, it is possible to provide a UI that enables a person from a beginner's class user to a talent who is accustomed in handing a robot to simply execute the generation and correction of the teaching data. Still further, because the talent whose is accustomed in handling the robot can teach the robot while confirming the teaching data and can operate the robot in trial and error to generate the teaching data, it is possible to teach the robot in high level with the simple operation.

Fifth Embodiment

Figure 19:
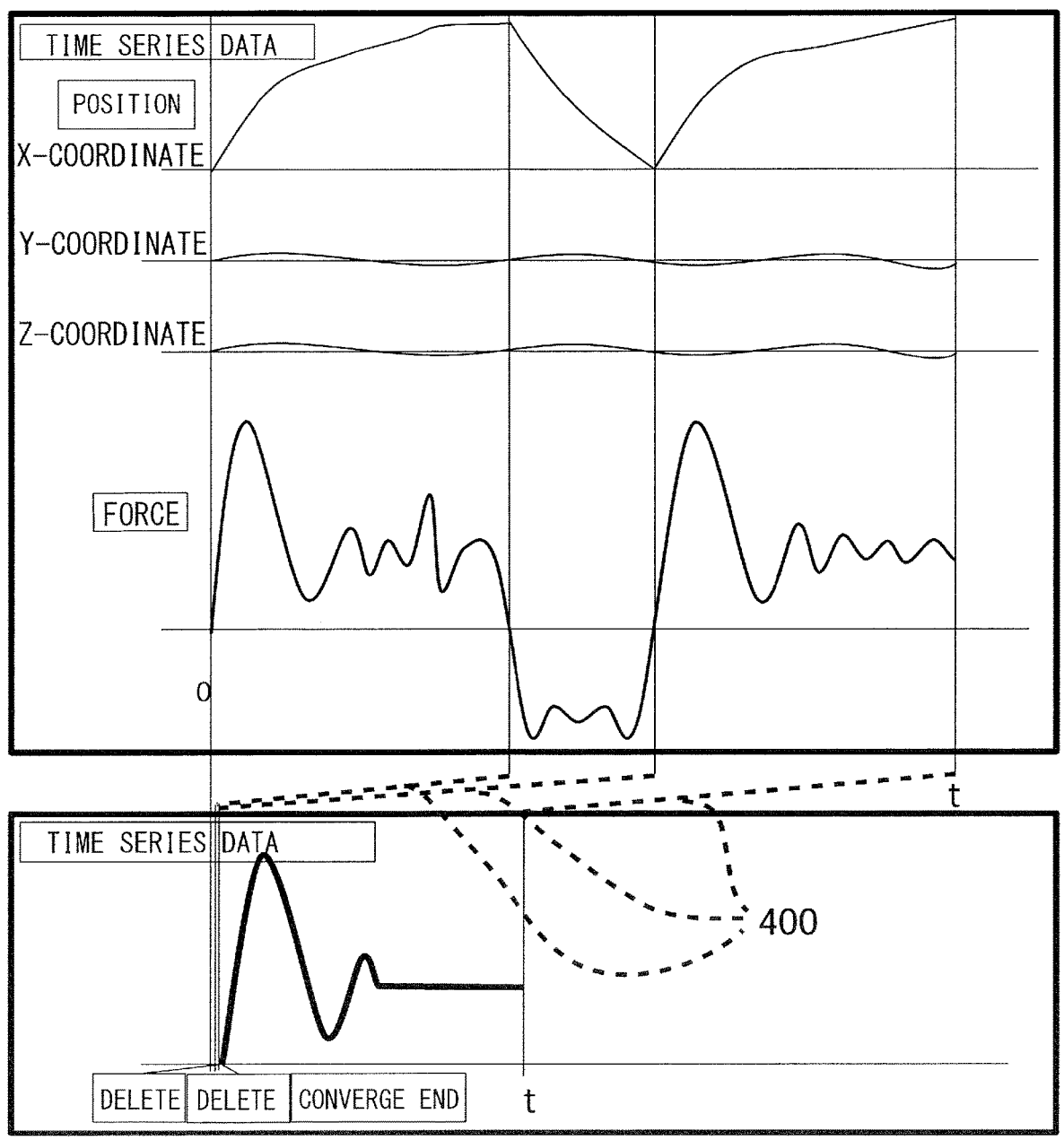
FIG. 19 is a schematic diagram illustrating a display area of a manipulator of a fifth embodiment.

Next, a fifth embodiment will be described with reference to FIG. 19. In the fifth embodiment, only points different from the fourth embodiment will be described and the same configuration with the fourth embodiment will be denoted by the same reference numerals and description thereof will be omitted here. The present embodiment is arranged such that the time series raw data and the time series teaching data are not displayed on the display area 256 in parallel by matching the time bases. For instance, as illustrated in FIG. 19, a part of the time base of the time series teaching data such as unnecessary operation is compressed, and corresponding lines 400 are indicated such that corresponding part of the section can be recognized and such that the compression amount of the data on the time bases can be readily seen.

It is noted that the present disclosure is not limited to the embodiments described above and may be modified within a technological thought of the present disclosure. The inventions described in the respective embodiments may be also combined in any ways. Still further, the effects described in the embodiments are merely enumeration of the most preferable effects brought about from the present disclosure, and the effects of the present disclosure is not limited to what described in the embodiments.

Other Embodiments

The present disclosure can be realized also by a process by which a program realizing one or more functions of the embodiments described above is supplied to the system or the apparatus through a network or a storage medium and by which one or more processors in a computer of the system or the apparatus reads and executes the program. It is also possible to realize by a circuit, e.g., ASIC, realizing one or more functions.

Still further, a case where the computer readable storage medium is the HDD 304 has been described, the present disclosure is not limited to such case and any storage medium such as a recording disk 326 may be used. More specifically, various storage media such as a flexible disk, an optical disk, e.g., CD-ROM and DVD-ROM, a magneto-optical disk, a magnetic tape, and a non-volatile memory such as a USB memory, a ROM and others may be used as the storage medium. The program 325 in the abovementioned embodiments may be also downloaded through a network to execute by the computer.

The present disclosure is not also limited to realizing the functions of the abovementioned embodiments by executing the program code read out by the computer. The present disclosure includes also a case where an OS (Operating System) or the like operated on the computer performs a part or whole of actual processes based on instructions of the program code and a case where the functions of the abovementioned embodiments are realized by such processes.

Still further, the program code read out of the storage medium may be written into a memory provided in a function extension board inserted into the computer or in a function extension unit connected with the computer. That is, the present disclosure includes also a case where a CPU and others provided in the function extension board or the function extension unit actually performs a part or whole of the actual processes and realize the functions of the abovementioned embodiments by the processes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023368, filed Feb. 13, 2018, and Japanese Patent Application No. 2018-227346, filed Dec. 4, 2018, which are hereby incorporated by reference herein in their entirety.

What is claimed is:

1. A controller of a robot system, the robot system comprising a robot arm to which an operator can perform direct teaching, a first sensor configured to acquire first information related to a contact force acting on a predetermined portion of the robot arm, a second sensor configured to acquire second information related to a position of the predetermined portion of the robot arm, and a third sensor configured to acquire third information related to an operational force by the direct teaching of the operator, the controller comprising a processing part executing:
   a first acquiring process of acquiring the first information, the second information, and the third information during the predetermined portion being moved by the direct teaching;
   a second acquiring process of acquiring information related to the contact force generated by a contact of the predetermined portion and a peripheral object based on the first information;
   a setting process of setting the second information in a first section and a second section during the predetermined portion being moved by the direct teaching, the first section being a section for performing a position control of the robot arm, and the second section being a section for performing a force control of the robot arm;
   a third acquiring process of acquiring information related to the operational force given by the direct teaching of the operator in the second section based on the first information and the third information; and
   a fourth acquiring process of acquiring force control data to perform the force control of the robot arm in the second section based on the information related to the operational force.

2. The controller according to claim 1,
   wherein the robot system includes a handling portion handled by the operator, and
   wherein the third sensor is configured to acquire the third information related to a force acting on the handling portion.

3. The controller according to claim 2, wherein the processing part further executing a fifth acquiring process of acquiring position control data to perform the position control of the robot arm in the first section based on the second information.

4. The controller according to claim 3, wherein the processing part determines whether a retry operation has been made at a time of teaching the robot arm based on the position or orientation data, and in a case where the retry operation has been made, the processing part updates the position control data and the force control data so as not to reproduce a failed operation.

5. The controller according to claim 2, wherein the first sensor is a force sensor provided between the handling portion and an end effector supported by the robot arm.

6. The controller according to claim 2, wherein the second sensor is a force sensor provided between the robot arm and the handling portion.

7. The controller according to claim 2, wherein the first sensor is disposed closer to a tip of the robot arm than the second sensor.

8. The controller according to claim 3, wherein the processing part is configured to output display information corresponding to the position control data and/or the force control data on a display unit.

9. The controller according to claim 8, wherein the processing part is configured to display the display information as time series information such that the first section and the second section are discernible from each other on the display unit.

10. The controller according to claim 8, further comprising an operation portion enabling a changing operation of changing display information displayed on the display unit by receiving an operation from the operator, and updating the position control data and/or the force control data based on the changing operation.

11. The controller according to claim 10, wherein the operation portion can select the first section and the second section independently and can perform the changing operation per each selected period.

12. The controller according to claim 10, wherein the operation portion can select a first short section subdivided from the first section and a second short section subdivided from the second section independently and can perform the changing operation per selected period.

13. The controller according to claim 10, wherein the operation portion is configured to be able to change a time width of a period displayed on the display unit.

14. The controller according to claim 10, wherein the operation portion comprises a selecting portion capable of selecting whether acquisitions of the first information and the third information are enabled in operating the handling portion.

15. The controller according to claim 10, wherein the display unit comprises a touch panel and the changing operation is executable based on an operation of the touch panel.

16. A robot system comprising:
   a robot arm to which an operator can perform direct teaching, a first sensor configured to acquire first information related to a contact force acting on a predetermined portion of the robot arm, a second sensor configured to acquire second information related to a position of the predetermined portion, a third sensor configured to acquire third information related to an operational force by the direct teaching of the operator, and a controller comprising a processing part executing: a first acquiring process of acquiring the first information, the second information, and the third information during the predetermined portion being moved by the direct teaching;
   a second acquiring process of acquiring information related to the contact force generated by a contact of the predetermined portion and a peripheral object based on the first information;
   a setting process of setting the second information in a first section and a second section during the predetermined portion being moved by the direct teaching, the first section being a section for performing a position control of the robot arm, and the second section being a section for performing a force control of the robot arm;
   a third acquiring process of acquiring information related to the operational force given by the direct teaching of the operator in the second section based on the first information and the third information; and a fourth acquiring process of acquiring force control data to perform the force control of the robot arm in the second section based on the information related to the operational force.

17. The robot system according to claim 16, wherein the robot system comprises an end effector supported by the robot arm and the first sensor acquires the first information related to a force acting on the end effector.

18. A control method of a controller controlling a robot system comprising a robot arm to which an operator can perform direct teaching, the control method comprising:

acquiring first information related to a contact force acting on a predetermined portion of the robot arm by using a first sensor, second information related to position of the predetermined portion by using a second sensor, and third information related to an operational force by the direct teaching of the operator during the predetermined portion moved by the direct teaching;

acquiring information related to a contact force generated by a contact of the predetermined portion and a peripheral object based on the first information;

setting the second information in a first section and a second section during the predetermined portion being moved by the direct teaching, the first section being a section for performing a position control of the robot arm, and the second section being a section for performing a force control of the robot arm;

acquiring information related to the operational force given by the direct teaching of the operator in the second section based on the first information and the third information; and acquiring force control data to perform the force control of the robot arm in the second section based on the information related to the operational force.

19. A non-transitory computer readable medium storing a program causing a computer to execute the control method as set forth in claim 18.

20. A product manufacturing method manufacturing a product by operating workpieces by controlling a robot system controlled by a controller, wherein the robot system comprises a robot arm to which an operator can perform direct teaching, a first sensor configured to acquire first information related to a force acting on a predetermined portion of the robot arm, and a second sensor configured to acquire second information related to a position of the predetermined portion, wherein the controller comprises a processing part executing the method of:

a first acquiring process of acquiring the first information and the second information, during the predetermined portion being moved by the direct teaching;

a second acquiring process of acquiring information related to a contact force generated by a contact of the predetermined portion and a peripheral object based on the first information;

a setting process of setting a first section and a second section in the second information during the predetermined portion being moved by the direct teaching, the first section being a section for performing a position control of the robot arm, the second section being a section for performing a force control of the robot arm; and a manufacturing process of manufacturing the product by operating workpieces by using the predetermined portion by controlling the robot arm by using a position control data of the first section and a force control data of the second section.

21. The controller according to claim 1, wherein the processing part is configured to set a section in which the information related to the contact force is determined to be zero as the first section, and wherein the processing part is configured to set a section in which the information related to the contact force is determined not to be zero as the second section.

22. The controller according to claim 2, wherein the processing part is configured to split the second section into a plurality of sections by analyzing frequency of the information related to the operational force in the second section.

23. The controller according to claim 22, wherein the processing part is configured to define a position of a change point of the frequency acquired by a frequency analysis as a position where the second section is split into the plurality of the sections.

24. The controller according to claim 2, wherein the processing part is configured to split the second section into a plurality of sections based on a magnitude of a change of the information related to the operational force in the second section.

25. The controller according to claim 24, wherein the processing part is configured to correct the information related to the operational force in a continuous section where a plurality of the sections in which the magnitudes of the change are lower than a threshold value continue by a predetermined number.

26. The controller according to claim 2, wherein the processing part is configured not to correct the information related to the operational force in a section where a direction of the information related to the operational force is inverted and the inversion is continuous in the second section.

27. The controller according to claim 2, wherein the processing part is configured not to correct the information related to the operational force in a section where plus and minus of the operational force is inverted in the second section.

28. The controller according to claim 2, wherein the processing part is configured not to correct the information related to the operational force in a section where plus and minus of the operational force is not inverted and the information related to the operational force at an end point of the section is within a predetermined range in the second section.

29. The controller according to claim 2, wherein the processing part is configured to correct the information related to the operational force in a section where plus and minus of the operational force is not inverted and the information related to the operational force at an end point of the section is outside of a predetermined range in the second section.

30. The controller according to claim 2, wherein the processing part is configured to determine a section where in a case where the operational force continuously fluctuates, the contact force does not change or a number of a change is a predetermine number or less in the second section as a section of an exploring operation.

31. The controller according to claim 3, wherein the processing part is configured to perform the position control of the robot arm in the first section based on the position control data and the second information, and wherein the processing part is configured to perform the force control of the robot arm in the second section based on the position control data, the force control data, and the first information and/or the third information.

32. The controller according to claim 3, wherein the processing part is configured to acquire the position control data by interpolating between two points of the second information by a predetermined interpolation method.

33. The controller according to claim 1, wherein the first section is a section for performing the position control when performing an operation of a predetermined part taught by the direct teaching, and the second section is a section for performing the force control when performing an operation of the predetermined part taught by the direct teaching.

34. The controller according to claim 1, wherein the controller is configured to acquire the second information as position control data to perform the position control of the robot arm.

35. The controller according to claim 1, wherein the second information includes first position data and second position data, wherein the controller is configured to interpolate the first position data based on the second position data in the first section to acquire the second information as position control data to perform the position control of the robot arm.

36. The controller according to claim 1, wherein the robot system includes a third sensor configured to acquire third information related to force acting on the predetermined portion, wherein the controller is configured to acquire information, based on the first and third information, related to operational force given by the operator during the predetermined portion is moved by the direct teaching, and wherein the controller is configured to select a first case and a second case, the first case being a case where the controller corrects information related to the operational force in the second section based on change of the operational force to acquire the information related to the operational force as force control data to perform the force control of the robot arm, and the second case being a case where the controller does not correct information related to the operational force in the second section to acquire the information related to the operational force as force control data to perform the force control of the robot arm.

37. The controller according to claim 36, wherein in the first case, the controller the controller corrects information related to the operational force in the second section based on a direction of the change or a number of the change to acquire the information related to the operational force as the force control data to perform the force control of the robot arm.

* * * * *